United States Patent
Vogler et al.

(10) Patent No.: US 6,907,058 B2
(45) Date of Patent: Jun. 14, 2005

(54) ENERGY MONITOR FOR MOLECULAR FLUORINE LASER

(75) Inventors: Klaus Vogler, Goettingen (DE); Frank Voss, Bad Gandersheim (DE); Elko Bergmann, Goettingen (DE)

(73) Assignee: Lambda Physik AG, Goettingen (DE)

( * ) Notice: Subject to any disclaimer, the term of this patent is extended or adjusted under 35 U.S.C. 154(b) by 900 days.

(21) Appl. No.: 09/771,013

(22) Filed: Jan. 25, 2001

(65) Prior Publication Data

US 2001/0028664 A1 Oct. 11, 2001

Related U.S. Application Data

(60) Provisional application No. 60/177,809, filed on Jan. 25, 2000.

(51) Int. Cl.[7] .............................................. H01S 3/223
(52) U.S. Cl. ........................................ 372/55; 372/57
(58) Field of Search ............................... 372/55–61, 98, 372/100

(56) References Cited

U.S. PATENT DOCUMENTS

| | | | |
|---|---|---|---|
| 4,009,933 A | 3/1977 | Firester | ...................... 350/152 |
| 4,240,044 A | 12/1980 | Fahlen et al. | .......... 331/94.5 PE |
| 4,380,079 A | 4/1983 | Cohn et al. | .................... 372/87 |

(Continued)

FOREIGN PATENT DOCUMENTS

| | | | | |
|---|---|---|---|---|
| DE | 295202 80 | 12/1995 | | |
| DE | 298 22 090 U 1 | 12/1998 | ............. | H01S/3/08 |
| EP | 0 236 137 A2 | 3/1987 | ............. | G01J/3/45 |
| EP | 0 532 751 B1 | 2/1991 | ........... | H01S/3/038 |
| EP | 0 532 751 A1 | 2/1991 | ........... | H01S/3/038 |
| EP | 0 459 503 A2 | 5/1991 | ............. | H01S/3/08 |
| EP | 0 459 503 A3 | 5/1991 | ............. | H01S/3/08 |
| EP | 0 790 681 A2 | 1/1997 | ........... | H01S/3/097 |
| EP | 0 867 774 A3 | 3/1998 | ............. | G03G/7/20 |
| EP | 0 867 774 A2 | 3/1998 | ............. | G03F/7/20 |
| JP | 63-86593 | 4/1988 | ........... | H01S/3/134 |
| JP | Hei 1-115182 | 5/1989 | ........... | H01S/3/134 |
| JP | Hei 3-166784 | 7/1991 | ........... | H01S/3/134 |
| JP | Hei 3-265180 | 11/1991 | ........... | H01S/3/097 |
| JP | Hei 4-17380 | 1/1992 | ........... | H01S/3/097 |
| WO | WO 99/19952 | 4/1999 | ............. | H01S/3/22 |

OTHER PUBLICATIONS

R.S. Taylor, "Preionization and discharge stability study of long optical pulse duration IV–Preionized XeCl lasers", *Appl. Phys.*, vol. B 41, 1–24 No. 1 Sep. 1986, pp. 1–24.

T.Y. Chang, "Improved uniform–field electrode profiles for tea laser and high–voltage applications", Nov. 13, 1972, vol. 44, No. 4, pp. 405–407.

(Continued)

*Primary Examiner*—Minsun Oh Harvey
*Assistant Examiner*—Philip Nguyen
(74) *Attorney, Agent, or Firm*—Stallman & Pollack LLP

(57) ABSTRACT

A beam parameter monitoring unit for coupling with a molecular fluorine ($F_2$) or ArF laser resonator that produces an output beam having a wavelength below 200 nm includes a detector and a beam path enclosure. The unit may also include a beam splitter within the enclosure for separating the output beam into first and second components, or first and second beam are attained by other means. The detector measures at least one optical parameter of the second component of the output beam. The beam path enclosure includes one or more ports for purging the beam path enclosure with an inert gas to maintain the enclosure substantially free of sub-200 nm photoabsorbing species. An optical path of the second component of the output beam through the enclosure from the laser resonator to the detector is substantially free of ssub-200 nm photoabsorbing species so that the second beam component reaches the detector without substantial attenuation from the photoabsorbing species, while the first component is used for processing a workpiece.

49 Claims, 16 Drawing Sheets

U.S. PATENT DOCUMENTS

| | | | |
|---|---|---|---|
| 4,393,505 A | 7/1983 | Fahlen | 372/57 |
| 4,399,540 A | 8/1983 | Bücher | 372/20 |
| 4,611,270 A | 9/1986 | Klauminzer et al. | 364/183 |
| 4,616,908 A | 10/1986 | King | 350/576 |
| 4,674,099 A | 6/1987 | Turner | 372/59 |
| 4,686,682 A | 8/1987 | Haruta et al. | 372/87 |
| 4,691,322 A | 9/1987 | Nozue et al. | 372/82 |
| 4,719,637 A | 1/1988 | Cavaioli et al. | 372/59 |
| 4,829,536 A | 5/1989 | Kajiyama et al. | 372/57 |
| 4,856,018 A | 8/1989 | Nozue et al. | 372/98 |
| 4,860,300 A | 8/1989 | Bäumler et al. | 372/57 |
| 4,874,948 A * | 10/1989 | Cielo et al. | 250/341.5 |
| 4,891,818 A | 1/1990 | Levatter | 372/57 |
| 4,905,243 A | 2/1990 | Lokai et al. | 372/32 |
| 4,926,428 A | 5/1990 | Kajiyama et al. | 372/20 |
| 4,953,174 A | 8/1990 | Eldridge et al. | 372/83 |
| 4,975,919 A | 12/1990 | Amada et al. | 372/33 |
| 5,001,721 A | 3/1991 | Ludewig et al. | 372/59 |
| 5,005,181 A | 4/1991 | Yoshioka et al. | 372/59 |
| 5,025,445 A | 6/1991 | Anderson et al. | 372/20 |
| 5,051,558 A | 9/1991 | Sukhman | 219/121.68 |
| 5,081,635 A | 1/1992 | Wakabayashi et al. | 372/57 |
| 5,095,492 A | 3/1992 | Sandstrom | 372/102 |
| 5,099,491 A | 3/1992 | Chaffee | 372/59 |
| 5,111,473 A | 5/1992 | Rebhan et al. | 372/59 |
| 5,136,605 A | 8/1992 | Basting et al. | 372/59 |
| 5,140,600 A | 8/1992 | Rebhan | 372/25 |
| 5,142,543 A | 8/1992 | Wakabayashi et al. | 372/32 |
| 5,150,370 A | 9/1992 | Furuya et al. | 372/106 |
| 5,221,823 A | 6/1993 | Usui | 219/121.78 |
| 5,226,050 A | 7/1993 | Burghardt | 372/20 |
| 5,243,614 A | 9/1993 | Wakata et al. | 372/29 |
| 5,247,531 A | 9/1993 | Müller-Horsche | 372/38 |
| 5,247,534 A | 9/1993 | Müller-Horsche | 372/58 |
| 5,247,535 A | 9/1993 | Müller-Horsche et al. | 372/86 |
| 5,307,364 A | 4/1994 | Turner | 372/60 |
| 5,337,330 A | 8/1994 | Larson | 372/86 |
| 5,377,003 A * | 12/1994 | Lewis et al. | 356/300 |
| 5,396,514 A | 3/1995 | Voss | 372/57 |
| 5,404,366 A | 4/1995 | Wakabayashi et al. | 372/29 |
| 5,405,207 A | 4/1995 | Zubli | 401/110 |
| 5,430,752 A | 7/1995 | Basting et al. | 372/59 |
| 5,440,578 A | 8/1995 | Sandstrom | 372/59 |
| 5,463,650 A | 10/1995 | Ito et al. | 372/57 |
| 5,534,034 A | 7/1996 | Caspers | 623/32 |
| 5,535,233 A | 7/1996 | Mizoguchi et al. | 372/87 |
| 5,557,629 A | 9/1996 | Mizoguchi et al. | 372/87 |
| 5,559,584 A | 9/1996 | Miyaji et al. | 355/73 |
| 5,559,816 A | 9/1996 | Basting et al. | 372/27 |
| 5,596,596 A | 1/1997 | Wakabayashi et al. | 372/102 |
| 5,598,300 A | 1/1997 | Magnusson et al. | 359/566 |
| 5,652,681 A | 7/1997 | Chen et al. | 359/831 |
| 5,659,419 A | 8/1997 | Lokai et al. | 359/330 |
| 5,659,531 A | 8/1997 | Ono et al. | 369/109 |
| 5,663,973 A | 9/1997 | Stamm et al. | 372/20 |
| 5,684,822 A | 11/1997 | Partlo | 372/95 |
| 5,710,787 A | 1/1998 | Amada et al. | 372/25 |
| 5,729,562 A | 3/1998 | Birx et al. | 372/38 |
| 5,729,565 A | 3/1998 | Meller et al. | 372/87 |
| 5,748,346 A | 5/1998 | David et al. | 359/15 |
| 5,761,236 A | 6/1998 | Kleinschmidt et al. | 372/100 |
| 5,763,855 A | 6/1998 | Shioji | 129/121.84 |
| 5,771,258 A | 6/1998 | Morton et al. | 372/57 |
| 5,802,094 A | 9/1998 | Wakabayashi et al. | 372/57 |
| 5,811,753 A | 9/1998 | Weick et al. | 219/121.78 |
| 5,818,865 A | 10/1998 | Watson et al. | |
| 5,835,520 A | 11/1998 | Das et al. | 372/57 |
| 5,852,627 A | 12/1998 | Ershov | 372/108 |
| 5,856,991 A | 1/1999 | Ershov | 372/57 |
| 5,898,725 A | 4/1999 | Fomenkov et al. | 372/102 |
| 5,901,163 A | 5/1999 | Ershov | 372/20 |
| 5,914,974 A | 6/1999 | Partlo et al. | 372/38 |
| 5,917,849 A | 6/1999 | Ershov | 372/102 |
| 5,923,693 A | 7/1999 | Ohmi et al. | 372/57 |
| 5,936,988 A | 8/1999 | Partlo et al. | 372/38 |
| 5,940,421 A | 8/1999 | Partlo et al. | 372/38 |
| 5,946,337 A | 8/1999 | Govorkov et al. | 372/92 |
| 5,949,806 A | 9/1999 | Ness et al. | 372/38 |
| 5,970,082 A | 10/1999 | Ershov | 372/102 |
| 5,978,391 A | 11/1999 | Das et al. | 372/20 |
| 5,978,394 A | 11/1999 | Newman et al. | 372/32 |
| 5,978,405 A | 11/1999 | Juhasz et al. | 372/57 |
| 5,978,409 A | 11/1999 | Das et al. | 372/100 |
| 5,982,795 A | 11/1999 | Rothweil et al. | 372/38 |
| 5,982,800 A | 11/1999 | Ishihara et al. | 372/57 |
| 5,991,324 A | 11/1999 | Knowles et al. | 372/57 |
| 5,999,318 A | 12/1999 | Morton et al. | 359/572 |
| 6,005,880 A | 12/1999 | Basting et al. | 372/38 |
| 6,020,723 A | 2/2000 | Desor et al. | 320/166 |
| 6,028,872 A | 2/2000 | Partlo et al. | 372/38 |
| 6,028,880 A | 2/2000 | Carlesi et al. | 372/58 |
| 6,061,382 A | 5/2000 | Govorkov et al. | 372/101 |
| 6,081,542 A | 6/2000 | Scaggs | 372/70 |
| 6,084,897 A | 7/2000 | Wakabayashi et al. | 372/38 |
| 6,128,323 A * | 10/2000 | Myers et al. | 372/38.1 |
| 6,151,346 A | 11/2000 | Partlo et al. | 372/38 |
| 6,154,470 A | 11/2000 | Basting et al. | 372/19 |
| 6,157,662 A | 12/2000 | Scaggs et al. | 372/60 |
| 6,160,831 A | 12/2000 | Kleinschmidt et al. | 372/57 |
| 6,160,832 A | 12/2000 | Kleinschmidt et al. | 372/57 |
| 6,188,710 B1 | 2/2001 | Besaucele et al. | 372/60 |
| 6,243,406 B1 * | 6/2001 | Heist et al. | 372/59 |
| 6,307,623 B1 * | 10/2001 | Papuchon et al. | 356/152.1 |
| 6,327,284 B1 * | 12/2001 | Stamm et al. | 372/32 |
| 6,327,290 B1 * | 12/2001 | Govorkov et al. | 372/61 |
| 6,442,182 B1 * | 8/2002 | Govorkov et al. | 372/29.021 |
| 6,463,084 B1 * | 10/2002 | Govorkov et al. | 372/9 |
| 6,477,192 B2 * | 11/2002 | Govorkov et al. | 372/57 |
| 6,490,305 B2 * | 12/2002 | Govorkov et al. | 372/57 |
| 6,624,424 B2 * | 9/2003 | Eckert et al. | 250/372 |
| 6,738,406 B2 * | 5/2004 | Vogler | 372/60 |
| 6,819,698 B1 * | 11/2004 | Vogler | 372/55 |
| 6,834,069 B1 * | 12/2004 | Bergmann et al. | 372/57 |
| 2003/0058429 A1 * | 3/2003 | Schriever | 355/133 |

OTHER PUBLICATIONS

E.A. Stappaerts, "A novel analytical design method for discharge laser electrode profiles", vol. 40, No. 12, Jun. 15, 1982, pp. 1018–1019.

Gerard J. Ernst, "Compact uniform field electrode profiles", *Optics Communications*, vol. 47, No. 1, Aug. 1, 1983, pp. 47–51.

Gerard J. Ernst, "Uniform–field electrodes with minimum width", *Optics Communications*, vol. 49, No. 4, Mar. 15, 1984, pp. 275–277.

Marchetti, et al., "A new type of corona–discharge photo-ionization source for gas lasers", *J. Appl. Phys.*, 56 (11) Dec. 1, 1984, pp. 3163–3168.

Ogura, et al., "Output power stabilization of a XeCl excimer laser by HCl gas injection", *Proceedings of SPIED: Gas and Metal Vapor Lasers and Applications*, Jan. 22–23, 1991, vol. 1412, pp. 123–128.

Golobic, et al., "Clinical experience with an excimer laser angioplasty system", *SPIE: Diagnostic and therapeutic cardiovascular interventions*, vol. 1425, Jan. 20–22, 1991, pp. 84–91.

Ujda, et al., "Analysis of possibility of computer control of the parameters of an excimer laser" *Journal of Technical Physics: Results of computerization of the parameters of a XeCl laser*, 1991, pp. 399–408.

Dr. D. Basting, *Industrial Excimer Lasers: Fundamentals, Technology and Maintenance*, Lambda Physik AG, 1991, pp. 1–97.

Turner, et al., "Dependence of excimer laser beam properties on laser gas composition", 1992, *SPIE* vol. 1835, pp. 158–164.

Elliott, et al., "Recent advances in an excimer laser source for microlithography", Nov./Dec. 1991, *J. Vac. Sci. Technol B9(6)*, 3122–3125.

Taylor, et al., "Pre–preionization of a long optical pulse magnetic–spiker sustainer XeCl laser", *Rev. Sci. Instrum.* 65(12) Dec. 1994, pp. 3621–3627.

Dirk Basting, Lambda Physik AG, Jan. 23, 1996, "laserröhre für halogenhaltige gasentladungslaser", 7 pages.

Borisov, et al.,"Effects Limiting the Average Power of Compact Pulse–Periodic KrF Lasers", *Quantum Electronics*, 1995, Vo. 25 No. 5, pp. 421–245.

Taylor, et al., "Transmission properties of spark preionization radiation in rare–gas halide laser gas mixes", *IEEE Journal of Quantum Electronics*, No. 12 Dec. 1995, pp. 2195–2207.

Billion level durable ArF excimer laser with highly stable energy, Wakabayashi, et al., *Laser Research Dept., Research Division*, Japan, 11 pages.

Enami, et al., "High spectral purity and high durability kHz KrF excimer laser with advanced RF pre–ionization discharge", *SPIE*, vol. 3334, pp. 1031–1040.

Solt, et al., "PtSi–n–Si Schottky–Barrier Photodetectors With Stable Spectral Responsivity in the 120–250 nm Spectral Range", *Appl. Phys. Lett*, Dec. 1996, 69(24), pp. 3662–3664.

Shaw, et al., "Ultraviolet radiometry with synchrotron radiation and cryogenic radiometry", *Applied Optics*, Jan. 1999, vol. 38, No. 1, pp. 18–28.

Shaw, et al., "New ultraviolet radiometry beamline at the synchrotron ultraviolet radiation facility at nist", *Metrologia*, 1998, 35, 301–306.

Kuschnerus, et al., "Characterization of photodiodes as transfer detector standards in the 120 nm to 600 nm spectral range", *Metrologia*, 1998, 35, pp. 355–362.

Korde, et al., "One gigarad passivating nitrided oxides for 100% internal quantum efficiency silicon photodiodes" *IEEE Transactions on Nuclear Science*, vol. 40, No. 6, Dec. 1993, PP. 1655–1659.

Canfield, et al., Absolute silicon photodiodes for 160 nm to 254 nm photons, *Metrologia*, 1998, 35, pp. 329–334.

Gullikson, et al., "Stable silicon photodiodes for absolute intensity measurements in the VUV and soft x–ray regions", 1996, *Journal of Electron Spectroscopy and Related Phenomena 80*, pp. 313–316.

Internet printout of website: www.ird–inc.com on Dec. 26, 2001; 59 pages.

* cited by examiner

ENERGY MONITOR FOR MOLECULAR FLUORINE LASER

PRIORITY

This application claims the benefit of priority to U.S. provisional patent application No. 60/177,809, filed Jan. 25, 2000.

BACKGROUND OF THE INVENTION

1. Field of the Invention

The invention relates to an energy monitoring device, and particularly for monitoring the energy of a molecular fluorine laser emitting around 157 nm.

2. Discussion of the Related Art

In the past, i.e., prior to the investigations leading up to the present application, very little was known about the behavior of UV-photodetectors under long-term 157 nm laser pulse radiation exposure. Only a limited number of CW synchrotron exposure experiments had been done at Physikalisch-Technische Bundesanstalt, Berlin (PTB) and the National Institute of Standards and Technology (NIST).

Until now, no reliable energy monitor for detecting the pulse energy of a molecular fluorine (F2) laser emitting around 157 nm has been available. For detecting 193 nm and 248 nm excimer laser radiation, UV-photodetectors such as the International Radiation Detectors, Inc. (IRD) UVG 100 or the Hamamatsu S 5226 or S1226 have been used typically as energy monitor detectors. However, these detectors strongly degrade under 157 nm laser exposure.

It is therefore desired to have a reliable photodetector for monitoring pulse energies and/or another parameter of a molecular fluorine laser beam.

RECOGNIZED IN THE INVENTION

Energy monitors are known for use with ArF and KrF excimer lasers emitting around 193 nm and 248 nm, respectively. These energy monitors are generally not useable for detecting 157 nm laser radiation. First, these previously used UV-detectors strongly degrade when used to detect a molecular fluorine laser beam, owing to the high photon energies associated with their 157 nm (7.9 eV) emission radiation. Second, any 157 nm energy monitor will use a special design, because of a very high sensitivity to residual absorption by gaseous species such as oxygen, water vapor and hydrocarbons at this wavelength, and due to contamination and degradation of optical components. Sophisticated purge and beam delivery conditions will be used to prevent degradation of the energy monitor during long term usage for detecting 157 nm radiation.

SUMMARY OF THE INVENTION

In accord with the above object, a beam parameter monitoring unit for coupling with a molecular fluorine (F2) and/or ArF laser resonator that produces an output beam having a wavelength around 157 nm and 193 nm, respectively, according to a first aspect of the invention is provided. The beam parameter monitoring unit includes an beam splitter, a detector and a beam path enclosure. The beam splitter is preferably uncoated and formed of substantially VUV transparent material disposed to reflect a portion of 157 nm radiation in the output beam. The detector measures at least one optical parameter of the output beam portion reflected by the beam splitter. The beam path enclosure contains the beam splitter and has an interior prepared such that an optical path of the beam portion through the enclosure from the laser resonator to the detector via the reflection by the beam splitter is substantially free of VUV photoabsorbing species so that the beam portion reflected by the beam splitter reaches the detector without substantial attenuation from the photoabsorbing species.

In further accord with the above object, a beam parameter monitoring unit for coupling with a molecular fluorine ($F_2$) and/or ArF laser resonator that produces an output beam having a wavelength around 157 nm and 193 nm, respectively, according to a second aspect of the invention is provided. The monitoring unit includes a beam splitter, a detector and a beam path enclosure. The beam splitter is disposed to separate the output beam into a first component and a second component, wherein the first component is used for processing a workpiece. The detector according to this second embodiment includes a platinum silicide window for measuring at least one optical parameter of the second component of the output beam after the beam splitter. The platinum silicide window reduces VUV radiation exposure induced instability of the detector. The beam path enclosure contains the beam splitter and has an interior prepared such that an optical path of the second component of the output beam through the enclosure from the laser resonator to the detector via the beam splitter is substantially free of VUV photoabsorbing species so that the second component reaches the detector without substantial attenuation from the photoabsorbing species.

In further accord with the above object, a beam parameter monitoring unit for coupling with a molecular fluorine ($F_2$) and/or ArF laser resonator that produces an output beam having a wavelength around 157 nm and 193 nm, respectively, according to a third aspect of the invention is provided. The monitoring unit includes a beam splitter, a detector and a beam path enclosure. The beam splitter is disposed to separate the output beam into a first component and a second component, wherein the first component is used for processing a workpiece. The detector according to this third embodiment includes platinum silicide for measuring at least one optical parameter of the second component of the output beam after the beam splitter. The diode detector including platinum silicide reduces VUV radiation exposure induced instability of the detector. The beam path enclosure contains the beam splitter and has an interior prepared such that an optical path of the second component of the output beam through the enclosure from the laser resonator to the detector via the beam splitter is substantially free of VUV photoabsorbing species so that the second component reaches the detector without substantial attenuation from the photoabsorbing species.

In further accord with the above object, a beam parameter monitoring unit for coupling with a molecular fluorine ($F_2$) and/or ArF laser resonator that produces an output beam having a wavelength around 157 nm and 193 nm, respectively, according to a fourth aspect of the invention is provided. The monitoring unit includes a detector and a beam path enclosure. First and second beam components are outcoupled from the laser resonator. The first component is used for processing a workpiece, while the second component is received at a detector including platinum silicide. The detector according to this fourth embodiment includes platinum silicide for measuring at least one optical parameter of the second component of the output beam, which preferably has a known relationship to a value of that parameter of the first component. The beam path enclosure has an interior prepared such that an optical path of the second component of the output beam through the enclosure from the laser resonator to the detector is substantially free of VUV photoabsorbing species so that the second component reaches the detector without substantial attenuation from the photoabsorbing species.

In further accord with the above object, a beam parameter monitoring unit for coupling with a molecular fluorine ($F_2$) and/or ArF laser resonator that produces an output beam having a wavelength around 157 nm and 193 nm, respectively, and an emission of visible radiation according to a fifth aspect of the invention is provided. The monitoring unit includes a beam splitter, a detector, a beam path enclosure and means for separating the visible radiation from the 157 nm radiation. The beam splitter is disposed to separate the output beam into a first component and a second component, wherein the first component is used for processing a workpiece. The detector measures at least one optical parameter of the second component of the output beam after the beam splitter. The beam path enclosure contains the beam splitter and has an interior prepared such that an optical path of the second component of the output beam through the enclosure from the laser resonator to the detector via the beam splitter is substantially free of VUV photoabsorbing species so that the second component reaches the detector without substantial attenuation from the photoabsorbing species. The separating means is disposed between the resonator and the detector.

In further accord with the above object, a beam parameter monitoring unit for coupling with a molecular fluorine ($F_2$) and/or ArF laser resonator that produces an output beam having a wavelength around 157 nm and 193 nm, respectively, according to a sixth aspect of the invention is provided. The monitoring unit includes a beam splitter, a detector and a beam path enclosure. The beam splitter is disposed to separate the output beam into a first component and a second component, wherein the first component is used for processing a workpiece. The detector measures at least one optical parameter of the second component of the output beam after the beam splitter. The beam path enclosure includes one or more ports for purging the beam path enclosure with an inert gas to maintain the enclosure substantially free of VUV photoabsorbing species. The beam path enclosure contains the beam splitter. The optical path of the second component of the output beam through the enclosure from the laser resonator to the detector via the beam splitter is substantially free of VUV photoabsorbing species so that the second component reaches the detector without substantial attenuation from the photoabsorbing species.

In further accord with the above object, a molecular fluorine ($F_2$) or ArF laser system is provided including a discharge chamber, multiple electrodes, a resonator and a beam parameter monitoring unit according to any of the first to sixth aspects of the invention. The discharge chamber is filled with a laser gas including molecular fluorine and a buffer gas, and further includes argon for the ArF laser. The multiple electrodes in the discharge chamber are connected to a discharge circuit for energizing the laser gas. The resonator has the discharge chamber therein for generating an output beam.

BRIEF DESCRIPTION OF THE DRAWINGS

FIGS. 10a–10b illustrate reproduceability in the spectral response of a SXUV-VUV-detector after 157 nm exposure after more than one billion laser shots, wherein FIG. 10a is a plot for a SXUV 037 detector and FIG. 10b is a plot for a SXUV 002 detector, and only small individual deviations are observed.

INCORPORATION BY REFERENCE

Figure 1:
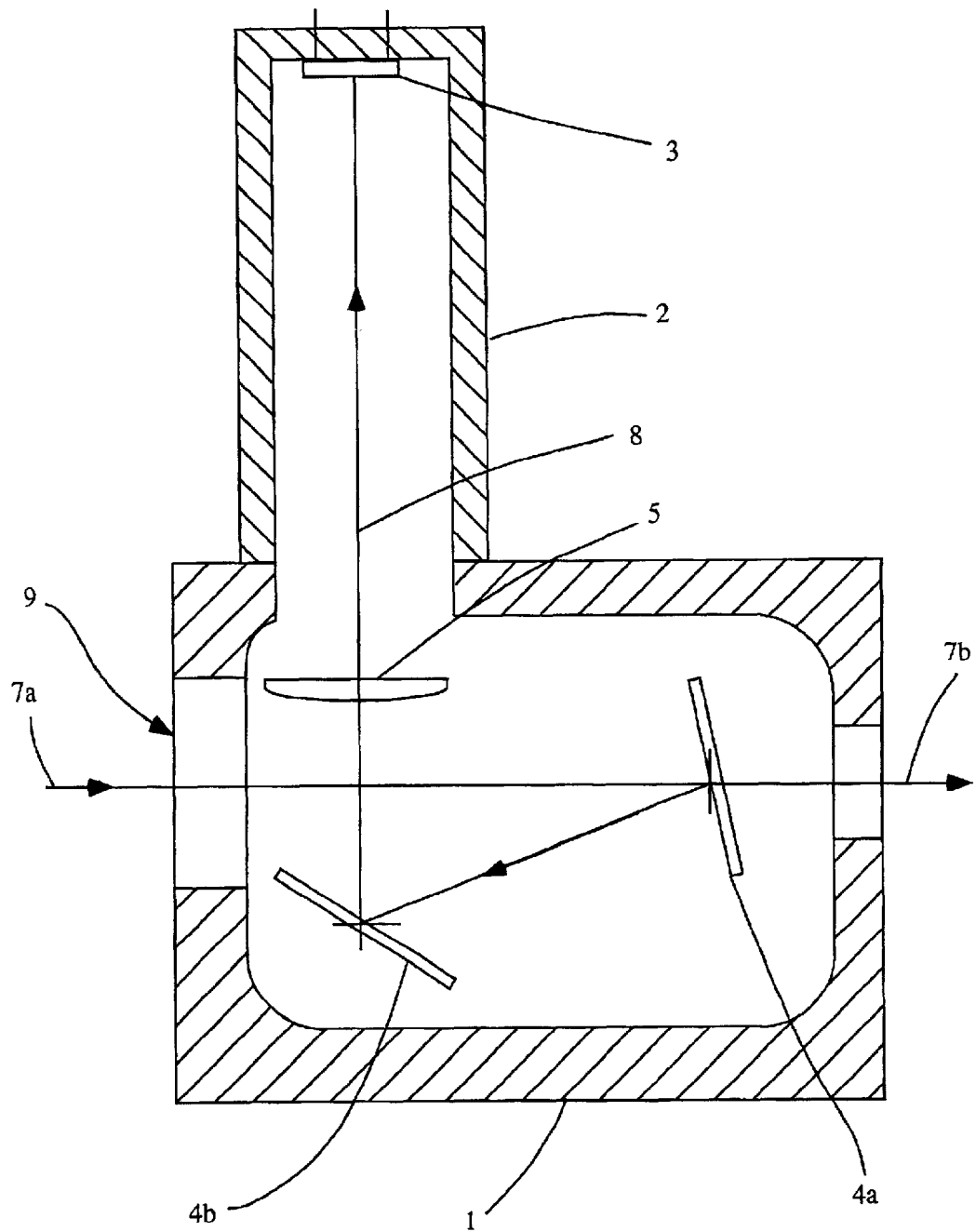
FIG. 1 schematically shows beam splitting enclosure including an energy monitor and beam splitting optics.

What follows is a cite list of references each of which is, in addition to those references cited above and below herein, including that which is described as background, and the above invention summary, are hereby incorporated by reference into the detailed description of the preferred embodiment below, as disclosing alternative embodiments of elements or features of the preferred embodiments not otherwise set forth in detail below. A single one or a combination of two or more of these references may be consulted to obtain a variation of the preferred embodiments described in the detailed description below. Further patent, patent application and non-patent references are cited in the written description and are also incorporated by reference into the detailed description of the preferred embodiment with the same effect as just described with respect to the following references:

K. Solt, et al., PtSi-n-Si Schottky-barrier photodetctors with stable spectral responsivity in the 120–250 nm spectral range, Appl. Phys. Lett 69, 3662 (1996);

P. S. Shaw, et al. Ultraviolet radiometry with synchrotron radiation and cryogenic radiometry, Appl. Optics 38, 18 (1999);

P. S. Shaw, et al., New ultraviolet radiometry beamline at the Synchrotron Ultraviolet Facility at NIST, Metrologia 35, 301 (1998);

P. Kuschnerus, et al., Characterization of photodiodes as transfer detector standards in the 120 nm to 600 nm spectral range, Metrologla 35, 355 (1998);

IRD datasheet, SXUV Series Photodiodes, September 1999 (www.ird-inc.com);

R. Korde, et al., One Gigarad passivating Nitride Oxide for 100% Internal Quantum Efficiency Silicon Photodiodes, IEEE Transactions on Nuclear Science 40, 1655 (1993);

L. R. Canfield, et al., Absolute Silicon photodiodes for 160 nm to 254 nm Photons Metrologia 35, 329 (1998);

R. Korde, et al., Stable silicon photodiodes with platinium Silicide front window for the ultraviolet, presented at the VUV-XII conference; and U.S. patent application Ser. Nos. 09/512,417, 09/598,552, 60/166,952, 09/343,333, 09/594,892, 09/131,580, 09/317,527, 09/317,695, 60/173,993, 60/166,967, 60/170,919 and 09/588,561, each application of which is assigned to the same assignee as the present application.

DETAILED DESCRIPTION OF THE PREFERRED EMBODIMENTS

The invention provides a detector for a monitoring an output beam parameter of a molecular fluorine or argon fluoride gas discharge laser operating at 157 nm or 193 nm, respectively. The preferred embodiment generally discloses a detector for use with molecular fluorine lasers emitting around 157 nm, but that disclosure is meant to refer to use with ArF lasers emitting around 193 nm, as well, except for that discussion that specifically relates to separating a visible emission from a 157 nm emission which discussion is specifically drawn to the $F_2$ laser. Preferred embodiments show little or no degradation of spectral sensitivity even after more than one billion laser shots or output pulses. The preferred embodiments include VUV-photodetectors which are very stable under strong 157 nm laser exposure with fluences >1 mJ/cm$^2$ and laser repetition rates >500 Hz under inert gas purged illumination conditions.

The preferred embodiments include a purgeable vacuum tight energy monitor housing which contains an advantageously stable VUV-photodiode detector, laser beam attenuators, apertures, VUV-light scattering plates, electrical pass through means, purge gas inlet and/or means of flowing purging gas through the exposed detector housing. FIG. 1 schematically shows a beam splitting enclosure including an energy detector 3 within an energy detector housing 2 and beam splitting optics 4a, 4b within a beam path enclosure preferably connected through a vacuum seal to the detector enclosure 2.

FIG. 1 shows in detail a beam path enclosure 1 containing the beam splitting optics 4a, 4b. The enclosure 1 preferably has an interior prepared such that an optical path of a incoming beam 7a and a split off beam portion 7c of the beam 7a through the enclosure 1 from a laser resonator (not shown) to a detector housing 2 containing the detector 3 is substantially free of VUV absorbing species so that the beam portion 7c can reach the detector without substantial attenuation due to the presence of VUV absorbing species.

The incoming beam 7a is preferably coming from a molecular fluorine laser resonator (not shown). The enclosure 1 is either connected directly to the outcoupler of the laser resonator, or at least a beam path from the outcoupler to a window 9 of the enclosure is substantially free of VUV absorbing species such as water vapor, oxygen and hydrocarbons such as having a flow of inert gas continuously present in the path of the beam 7a. The outcoupling from the laser resonator is preferably at a partially reflecting resonator reflector such as a partially reflecting mirror or interferometric device such as an etalon or otherwise as may be described at U.S. patent application Ser. No. 09/715,803, which is assigned to the same assignee and is hereby incorporated by reference.

The beam 7b is shown passing through the beam splitter 4a and exiting from the enclosure 1. Preferably, another enclosure such as of an imaging system or of a beam path that leads to an application process is connected directly to the enclosure, or at least the beam path is free of VUV absorbing species, such as described above with respect to the incoming beam. The beam 7a may alternatively be previously split off from a beam that is transmitted to an application process, or the beam that is used at the application process may be outcoupled from the resonator at a different location of the resonator than the beam portion 7a, such as at a reflecting surface within the resonator, or vice-versa with respect to these two beams.

The beam 7a is shown incident at a beam splitter 4a. In this embodiment, the beam splitter 4a is preferably an uncoated VUV transmissive plate such as may be formed from $CaF_2$ or $MgF_2$, or alternatively another VUV transmissive material such as $BaF_2$, LiF, or another material known to those skilled in the art. Advantageously, the preferred uncoated $CaF_2$ or $MgF_2$ plate is used so that coating damage is prevented from exposure to a high energy VUV beam, and so that a visible emission from the molecular fluorine laser is significantly suppressed from the beam 7b. The beam 7c is then reflected from a VUV mirror 4b through optics 5 and into the detector enclosure 2 and is incident on the detector 3.

As a whole the energy monitor unit includes a beam separation box containing beam splitting optics 4a, 4b and the VUV detector housing 2 which contains a preferred VUV-photodetector 3, as described in more detail below. Preferably, the VUV detector housing 2 is directly connected to the beam path enclosure 1 by a suitable vacuum fitting, preferably a DN40 flange (not shown in FIG. 1, but see flange 16 at FIG. 2). Both housings 1 and 2 are preferably vacuum tight and are purged by suitable purge gases such as $N_2$ or Ar or another inert gas that does not significantly absorb VUV radiation, e.g., around 157 nm. This preferred arrangement advantageously prevents absorption of the 157 nm VUV radiation which is emitted by the molecular fluorine ($F_2$) laser, and enters the beam enclosure 1 from the left in FIG. 1 via a purged beam line directly connected to the output coupler of the laser resonator (not shown in FIG. 1), or otherwise as discussed above.

In a preferred embodiment, the beam separation box including the enclosure 1 contains suitable optics to split a certain beam portion 7c (about 1% to 15%) of the main beam 7a, and redirect the beam portion 7c into the detector housing 2, and those optics may be alternatively to those described above, such as are described at the '552 and/or '952 applications, mentioned above. In addition, to reduce and attenuate the amount of red light in the beam portion 7c, means are preferably used to further reduce or cancel totally the residual red light emission of the molecular fluorine laser from the detector beam 7c. Such means may include an aperture disposed at or near position 8 of FIG. 1, or a special absorber shield may be used, such as may surround the VUV mirror 4b which preferably transmits the red radiation and is absorbed by the shield so that it does not reflect into the detector housing 2, as set forth in the '952 application.

As mentioned above, in a preferred embodiment, the beam splitting optics 4a, 4b within the enclosure 1 of the beam separation box may include a blank uncoated $MgF_2$ or $CaF_2$ beam splitter 4a disposed in the path of the main beam line 7a and a highly reflective (HR) mirror for 157 nm VUV radiation 4b as an additional beam steering mirror. This configuration is advantageously inexpensive to manufacture and prevents problems associated with coating damage due to exposure to the high power main beam 7a and achieves a visible red light suppression of at least a factor of 10. The beam splitter 4a may, however, include one or more coatings. Other preferred embodiments may include other optical elements for red light and VUV separation, e.g., a diffraction grating, holographic beam sampler or one or more dichroic mirrors as described in the '552 application, mentioned above. In addition, refractive elements such as one or more dispersion prisms preferably comprising $CaF_2$ or $MgF_2$, or alternatively LiF, $BaF_2$ or the like, may be used.

In an alternative embodiment, a beam splitter is not used. Instead, a first beam is outcoupled from a laser resonator and a second beam is outcoupled from the laser resonator already separate from each other. In this embodiment, preferably one of the beams is outcoupled from a partially reflective resonator reflector, which may be a partially reflecting mirror or interferometric device such as may be described at U.S. patent application Ser. No. 09/715,803, hereby incorporated by reference. The other beam is outcoupled from an angled surface of another optical component of the resoantor, such as a prism, laser tube window, intracavity beam splitter, polarization plate, or attenuator plate. The second beam may be outcoupled from a second partially reflective resonator reflector, such that the first beam is outcoupled at one end of the resonator and the second beam is outcoupled at the other end of the resonator. In an alternative example, the outcoupler of the laser resonator may separate the two beam components. Therefore, including a beam splitter 4a, or grating, holographic beam sampler, dichroic mirror, dispersion prism having a partially reflecting surface, etc. for separating a single outcoupled beam into two components such that one component is used to process a workpiece and the other incident at a VUV detector 3 is merely preferred and not necessary, as understood from the above. Any additional optics such as mirror 4b are also merely preferred. Preferably, the component measured at the detector 3 has at least one parameter such as energy, wavelength, bandwidth, spatial or temporal beam profile, divergence, spatial or temporal coherence, etc. that it is desired to be measured that has a known relationship to the same parameter in the other component that is used for processing the workpiece.

Figure 2:
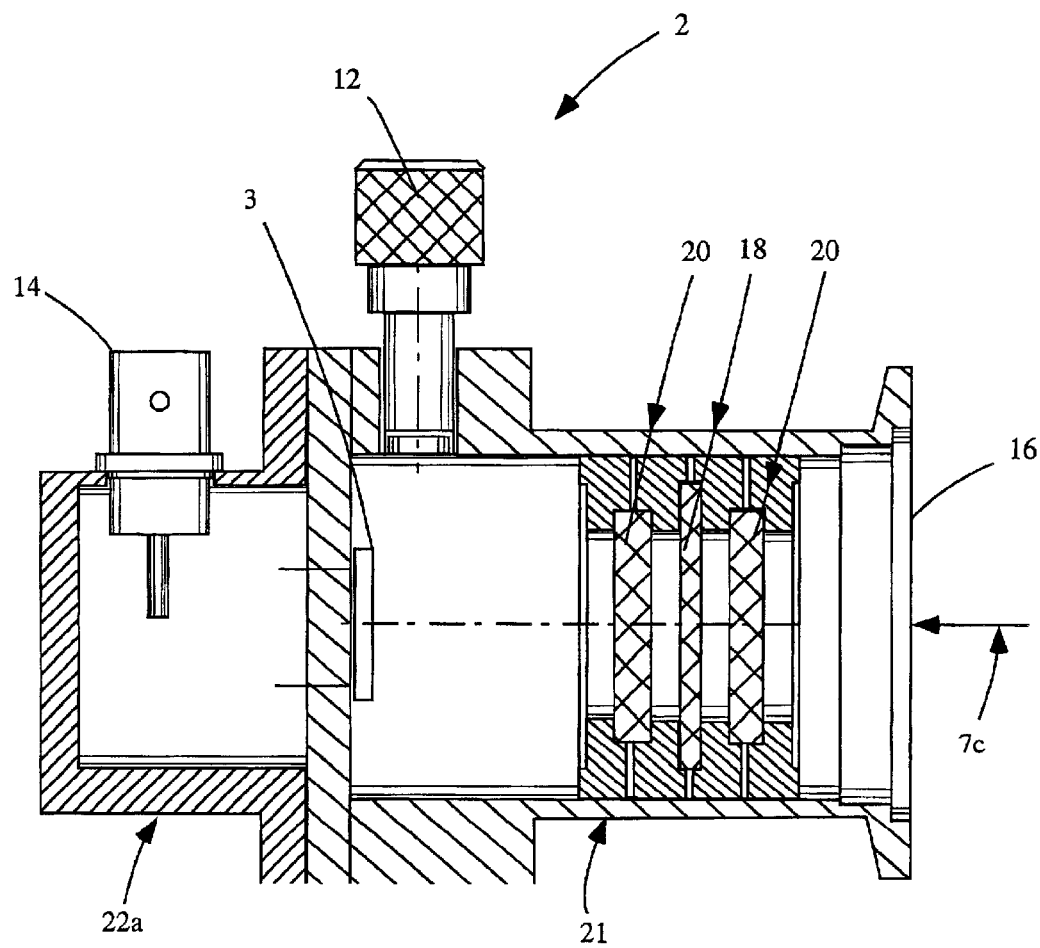
FIG. 2 schematically shows an energy monitor housing which includes a VUV-detector, insertions for several mesh attenuators and scattering plates, a purge gas inlet and a signal cable connector plug.

FIG. 2 shows a schematic view of the detector housing 2 of FIG. 1 in more detail. The detector housing 2 includes a gas purge inlet 12, and a signal cable connector 14 which is preferably a BNC connector, as shown, and may be another signal cable connector as understood by those skilled in the art, for transmitting electrical signals between the detector 3 and monitoring equipment such as a processor or viewing scope (not shown). The signal cable connector 14 is preferably mounted to the housing 2 by a vacuum tight seal. In addition, the detector housing 2 preferably includes one or more apertures and slits for insertion of a VUV and/or red light attenuator 18, one or more scattering plates 20 and the VUV-detector itself 3. The detector housing 2 also preferably has a flange 16, such as preferably a DN40 flange, for vacuum tight coupling to the enclosure 1 of FIG. 1. Additionally the detector housing 2 is preferably covered by an electrically conducting shield (not shown), which could be a fine wire mesh or other electrical or magnetic shielding as understood by those skilled in the art, to prevent EMV noise from penetrating into the detector housing 2. Preferably, the detector housing 2 is vacuum tight at all connections and contains multiple purge gas slits including gas inlet 12 to ensure an even and continuously flowing purge gas throughput into all areas of the detector housing 2.

The detector housing 2 may be advantageously quickly evacuated and backfilled or purged with an inert gas without accumulation of contaminants or VUV photoabsorptive species of gas which could otherwise produce errors in monitoring a beam parameter by detecting the small amount of VUV radiation 7c which is received by at the detector 3 (typically about 1% to 0.001% of the radiation density of the main part of the beam 7a).

As seen in FIG. 2, the detector 3 receives a beam portion 7c which enters a front portion 21 of the detector housing 2 where the flange 16 connects sealable to the enclosure 1 of FIG. 1. The beam traverses the attenuator 18 and scattering plates 20 and preferably one or more apertures (not shown) prior to impinging upon the detector 3. The signal cable connector 14 is located in a back portion 22a of the detector housing 2.

Figure 3:
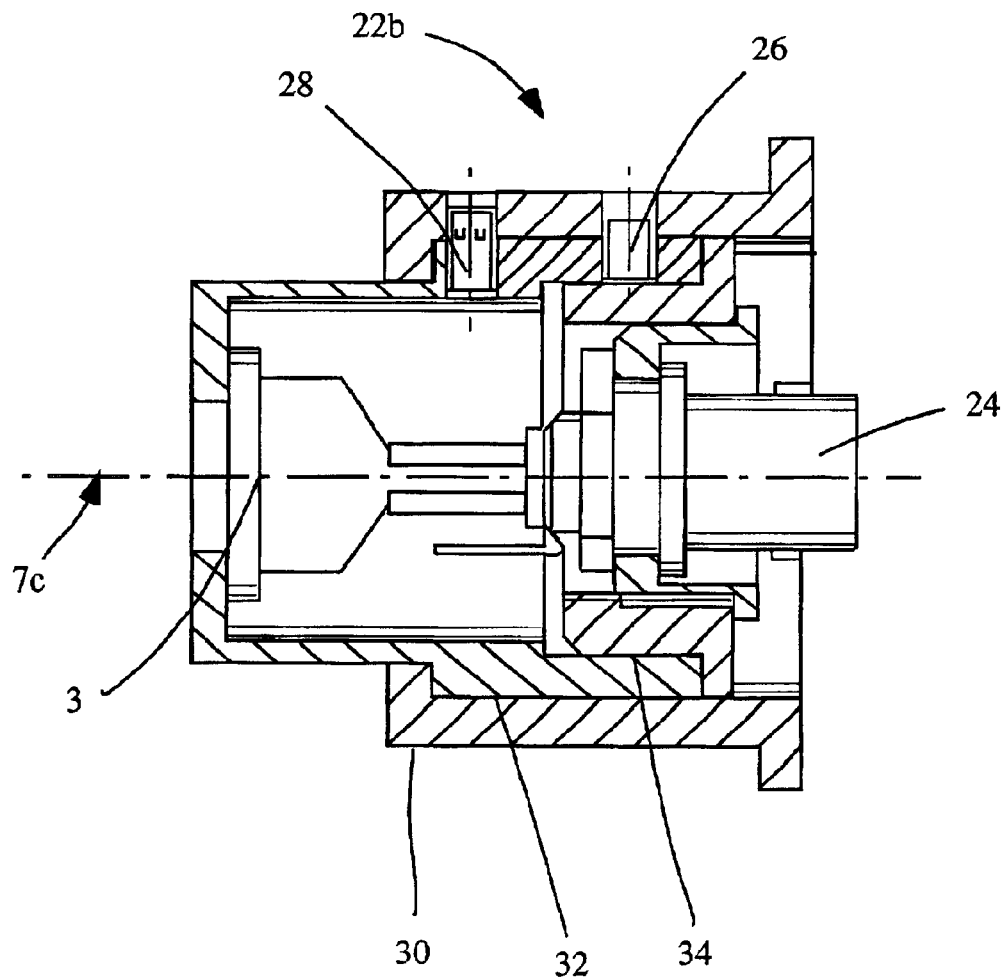
FIG. 3 schematically shows a portion of a detector housing including a vacuum tight interconnection between exchangeable detectors and a pass through BNC-connector.

FIG. 3 schematically shows a detailed view of a modified embodiment of the back portion 22b of a vacuum tight detector, which performs a same function as the detector housing 2 of FIG. 2, and which shows the detector 3 disposed within the back portion 22b. The beam 7c is then incident at the detector 3 through an optical opening between the front portion 21 (not shown, but see FIG. 2) and the back portion 22b. The signal cable connector plug 24 has two O-ring seals 26, 28 between three housing sections 30, 32, 34 to the back portion of detector housing 22b, making it vacuum tight.

Figure 4A:
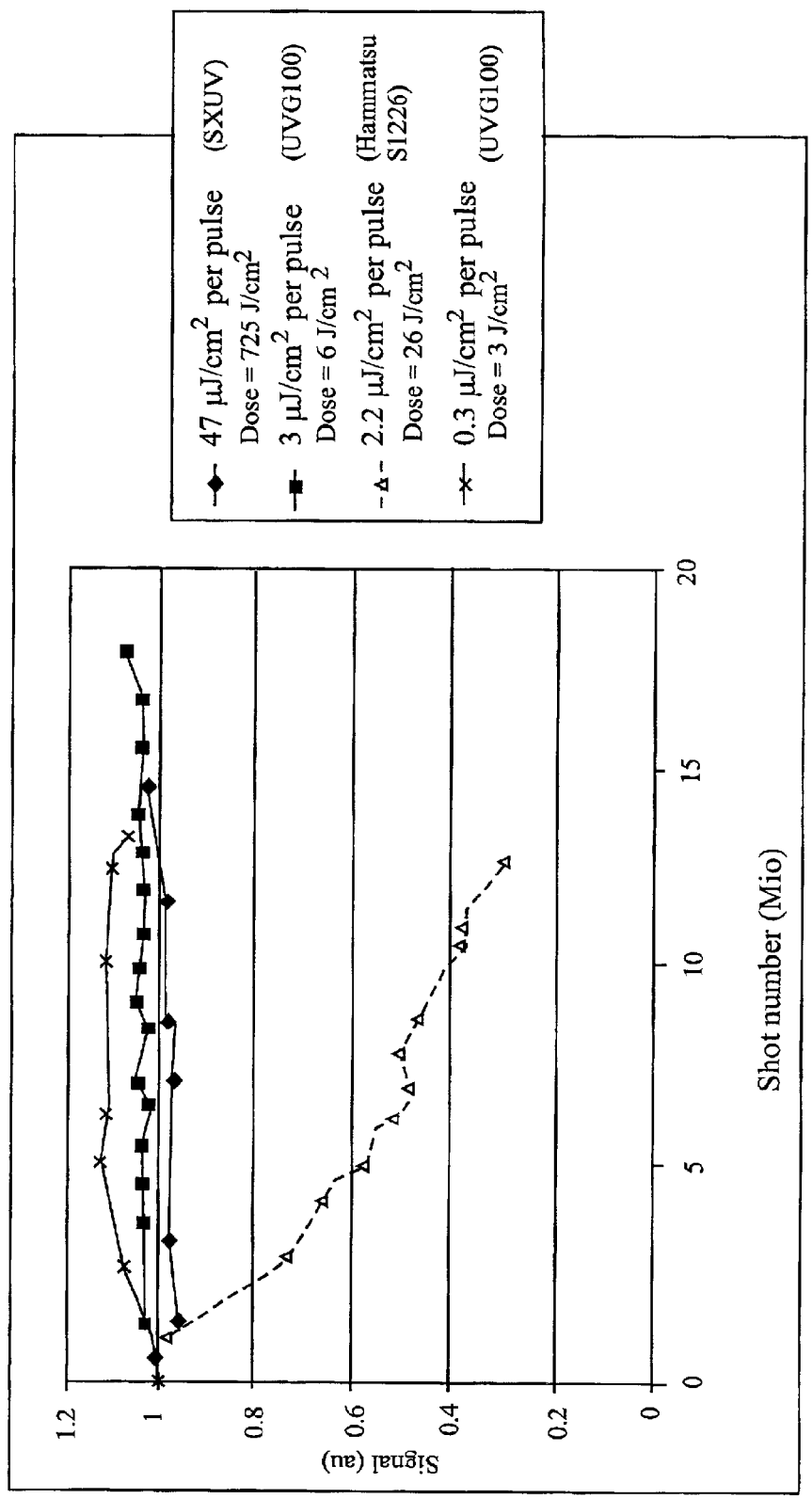
FIG. 4a shows several plots of signal intensity versus shot number illustrating detector stabilities over millions of 157 nm molecular fluorine laser pulses at different exposure levels per pulse and indicating absolute exposure amounts.

FIG. 4a shows several plots of signal intensity versus shot number illustrating detector stabilities over millions of 157 nm molecular fluorine laser pulses at different exposure levels per pulse and indicating absolute exposure amounts. The legend shows the value of fluences which tilt the different detector surfaces to produce a similar signal output and the total exposure dose accumulated during the illumination run. The 47 $\mu J/cm^2$ per pulse and 725 J/cm2 dose was applied at a SXUV detector which included PtSi therein. The 3 $\mu J/cm^2$ and 0.3 $\mu J/cm^2$ per pulse and 6 $J/cm^2$ and 3 $J/cm^2$ dose, respectively, were applied at a UVG 100 detector. The 2.2 $\mu J/cm^2$ per pulse and 26 $J/cm^2$ dose was applied at a Hammamatsu S1226 detector. The Hammamatsu S1226 detector began to degrade in the first few million applied shots and continued to do so almost linearly, while the SXUV and UVG 100 detectors showed relatively little or no degradation.

Figure 4B:
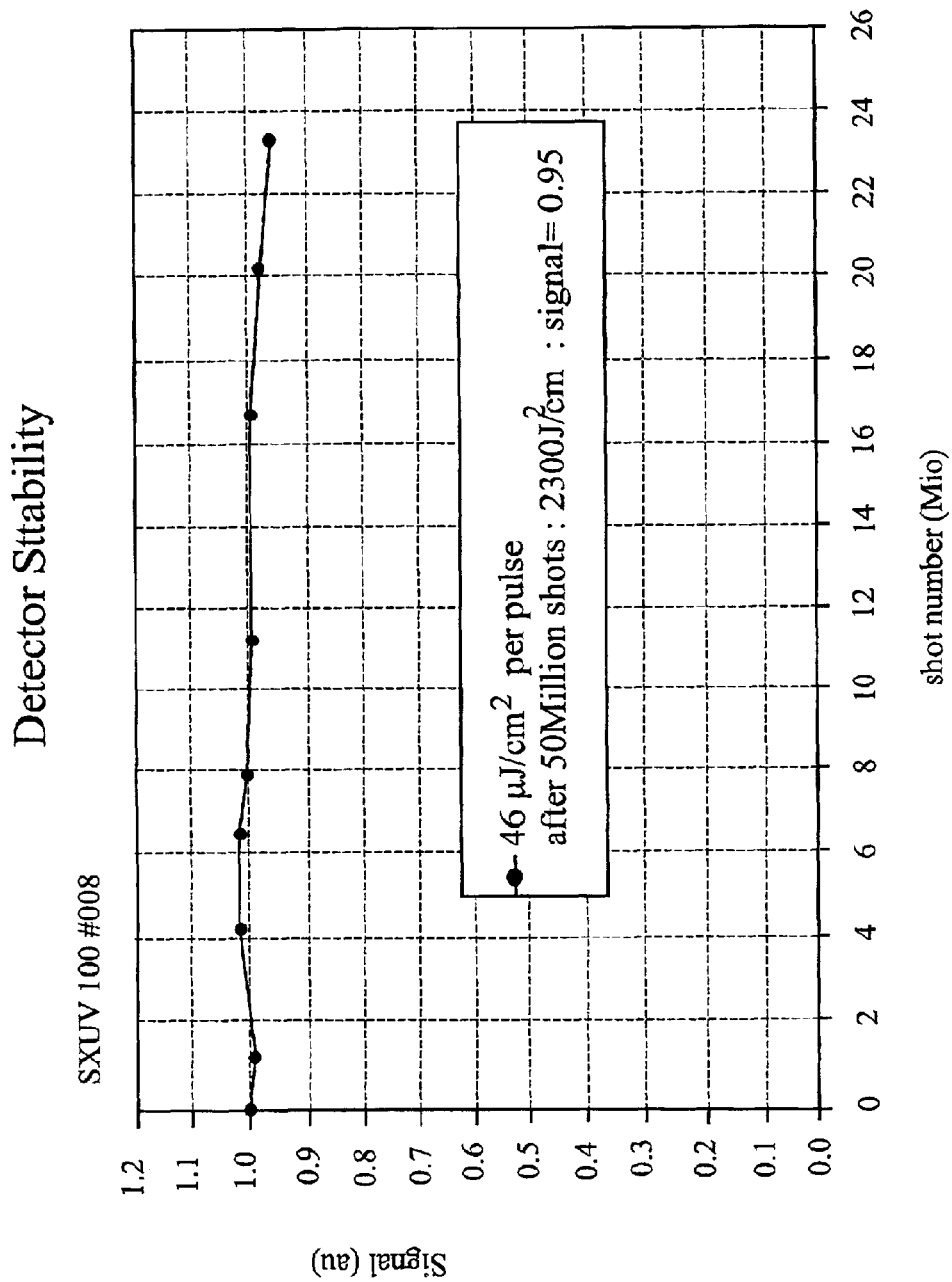
FIG. 4b shows a plot of detector stability for a SXUV detector mounted in an energy detector housing over several millions 157 nm molecular fluorine laser pulses.

FIG. 4b shows a plot of detector stability for a SXUV 100 #008 detector including platinum silicide, which may in the form of a window through which the light of the beam to be monitoring enters the diode structure, or otherwise, for reducing VUV exposure induced instabilities of the detector 3. The SXUV detector 3 was mounted in an energy detector housing 2 such as described above with reference to FIGS. 1–3 over several million 157 nm molecular fluorine laser pulses.

FIGS. 4a–4b, and additional plots FIG. 6 through FIG. 12b illustrate that some detectors degrade in sensivity very quickly when exposed to 157 nm radiation. Other detectors, e.g., the preferred SXUV detector including the PtSi window mentioned above, from International Radiation Detectors, Inc. (IRD), are very stable under 157 nm laser pulse exposure and are preferably used as VUV detectors mounted in the energy monitor housing 2 of the preferred embodiment.

Figure 5:
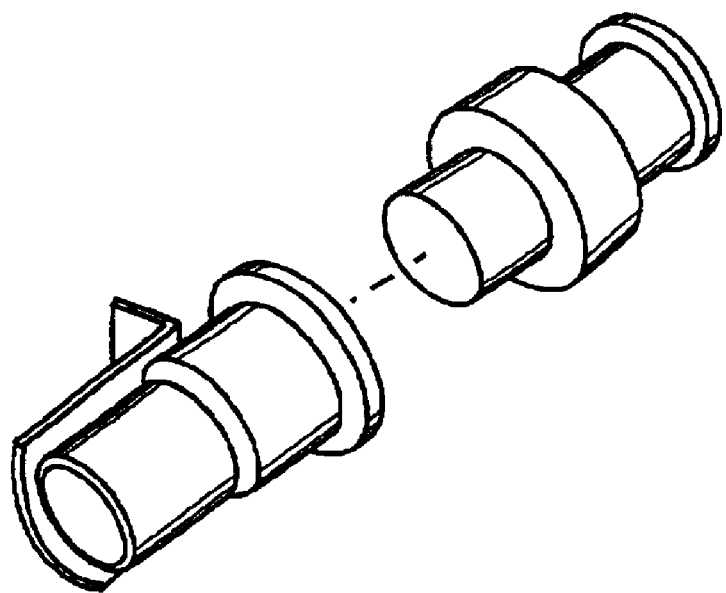
FIG. 5 is an image of an outer view of an energy monitor housing showing a purge gas inlet, a BNC-signal plug and a DN 40 flange for vacuum tight mounting.

FIG. 5 is an image view of an outside of an energy monitor housing 2 showing a purge gas inlet 12, a BNC-signal plug 14 or 24 and a DN40 flange 16 for vacuum tight mounting. Each of the inlet 12, plug 14 or 24 and flange 16 have been described with reference to FIGS. 2-3 above.

Figure 6:
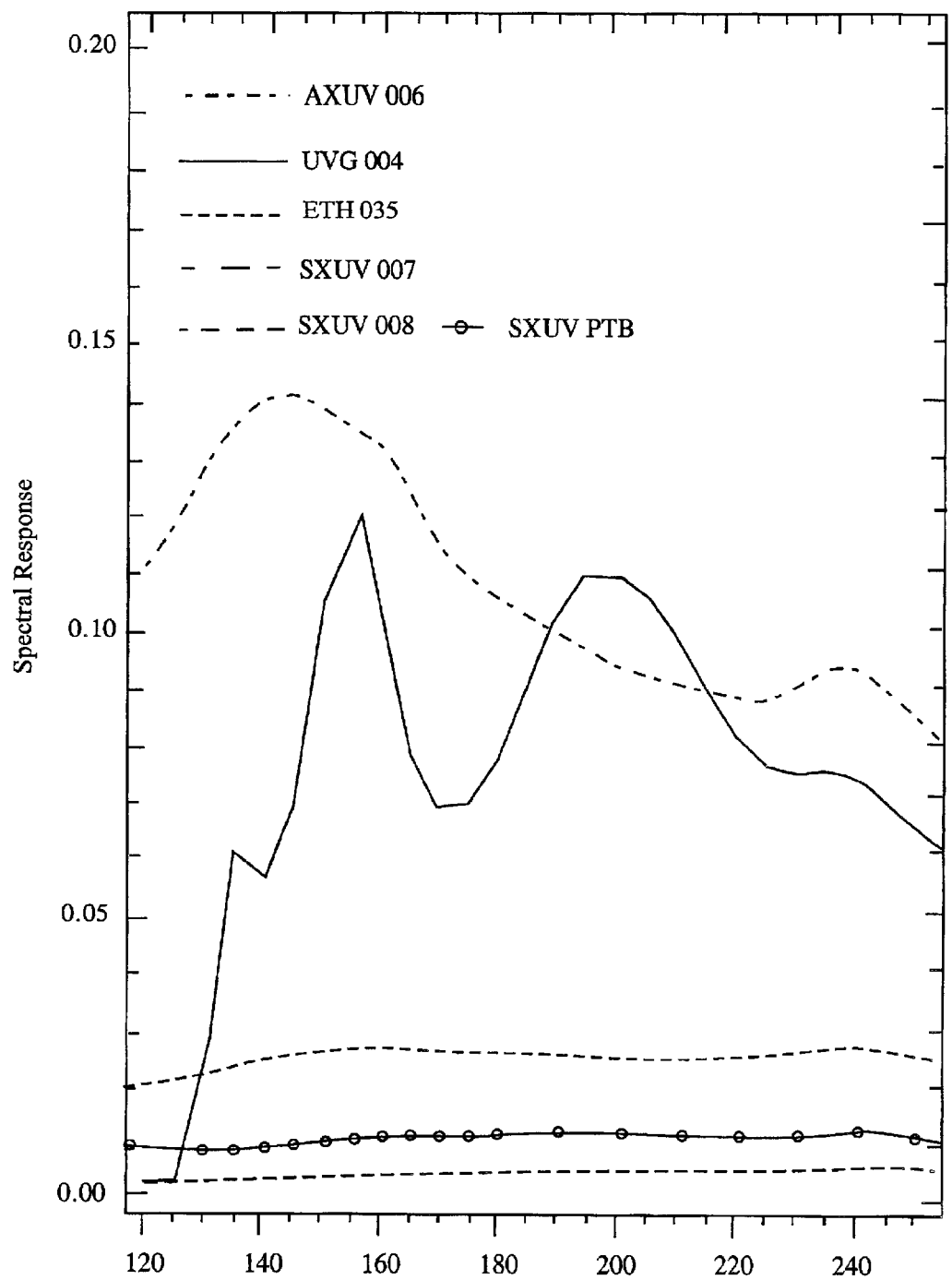
FIG. 6 shows several plots of absolute spectral response for different VUV-detectors in the spectral range of 120 nm to 250 nm measured by tunable synchrotron radiation.

FIG. 6 shows several plots of absolute spectral response for different VUV-detectors in the spectral range of 120 nm to 250 nm measured by tunable synchrotron radiation. FIG. 6 clearly shows the SXUV 007 detector as having the highest response among detectors measured in generating the plots of FIG. 6. The UVG 004 also exhibited a significant response around 157 nm, while each of the AXUV 006, ETH 035 and SXUV PTB did not.

FIG. 6 shows different spectral response curves of several detectors which have been investigated to check the stability under 157 nm laser exposure. FIG. 6 shows a large difference in amount of degradation between the detectors tested. Based on the plots of FIG. 6, one can see why the SXUV 007 is a preferred detector and the UVG 004 is alternatively preferred, while the others indicated at FIG. 6 are not preferred as being suitable for energy monitoring for long term regulation and stabilization of $F_2$ laser 157 nm output.

As seen in FIG. 6 the relative sensitivities of the detectors measured under 157 nm exposure differs by several orders of magnitude. The UVG 004 detector demonstrates a high sensitivity, and also a strong variation of sensitivity in this spectral region, whereas other detectors possess a smooth and flat spectral sensitivity curve (measured by tunable synchrotron radiation).

Figure 7A:
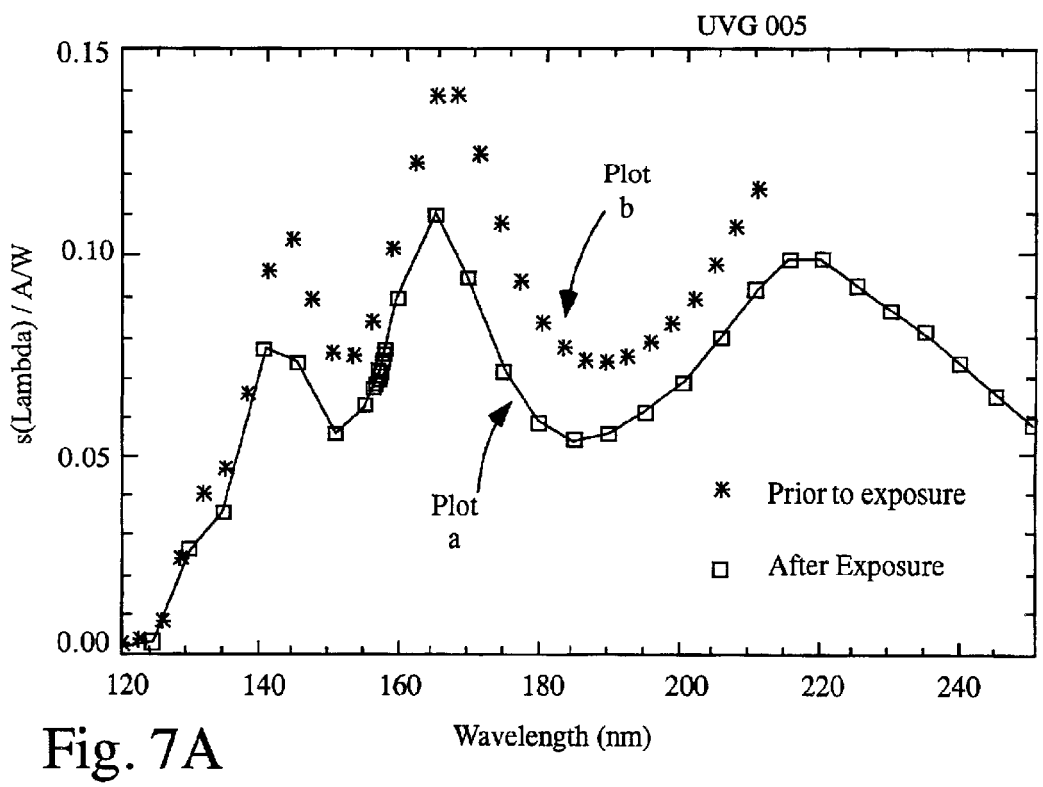
FIGS. 7a–7d show plots illustrating that a small degradation of spectral sensitivity for each of a UVG 100 VUV-detector (FIGS. 7a–7b) and a UVG 004 VUV-detector (FIGS. 7c–7d) is observed after 157 nm exposure with more than one billion laser shots.
Figure 7B:
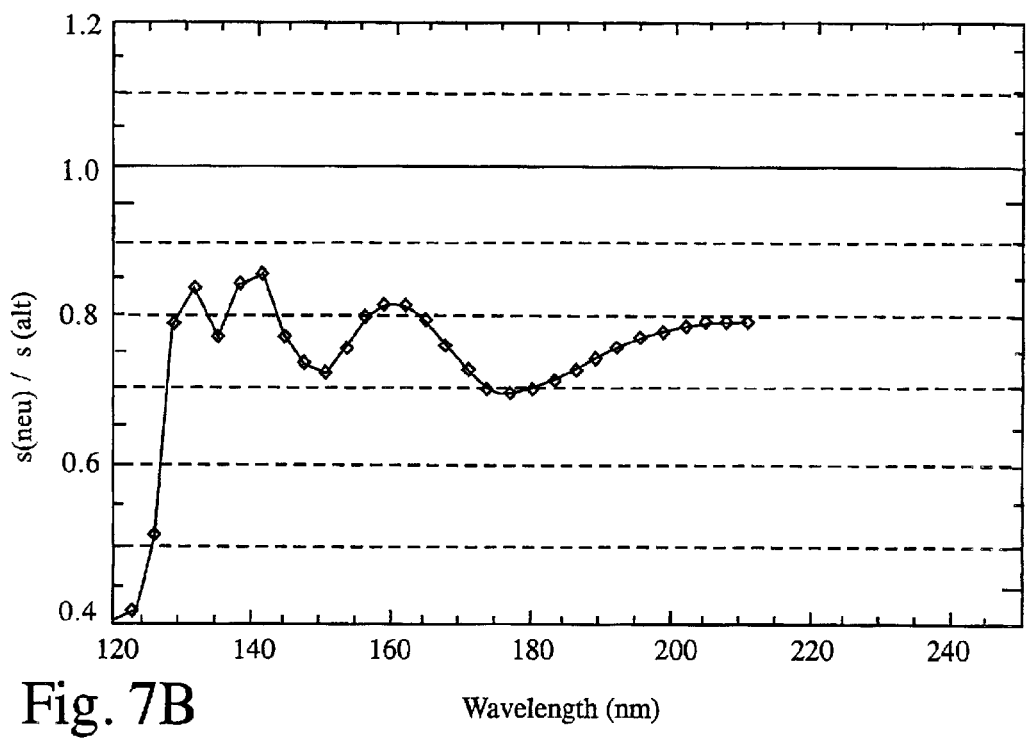

FIGS. 7a–7d show plots illustrating that a small degradation of spectral sensitivity for each of a UVG 100 VUV-detector (FIGS. 7a–7b) and a UVG 004 VUV-detector (FIGS. 7c–7d) is observed after 157 nm exposure with more than one billion laser shots. FIG. 7a shows plot a and plot b of spectral response of a UVG 005 detector versus wavelength respectively after and before exposure by more than one billion 157 nm laser shots. FIG. 7b shows a calibration plot indicating an amount of degradation of the detector versus wavelength over the exposure period, wherein 1.0 would indicate that no degradation has occurred due to the 157 nm radiation exposure. At 157 nm, the spectral response was shown to decrease by about 25%.

Figure 7C:
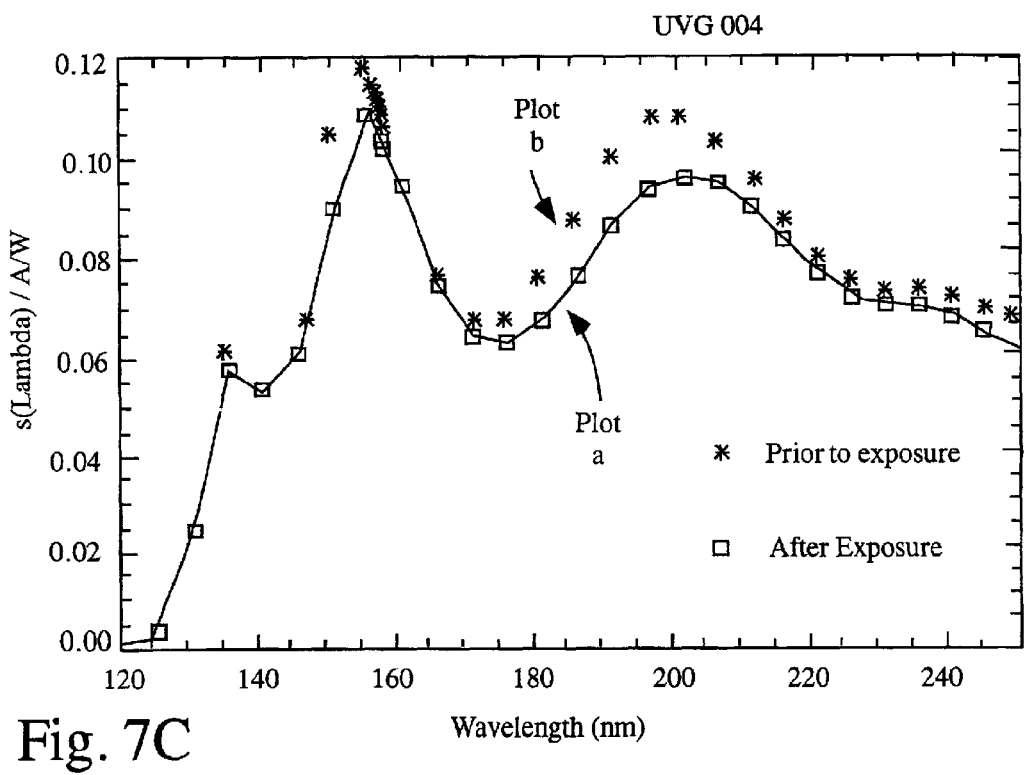
Figure 7D:
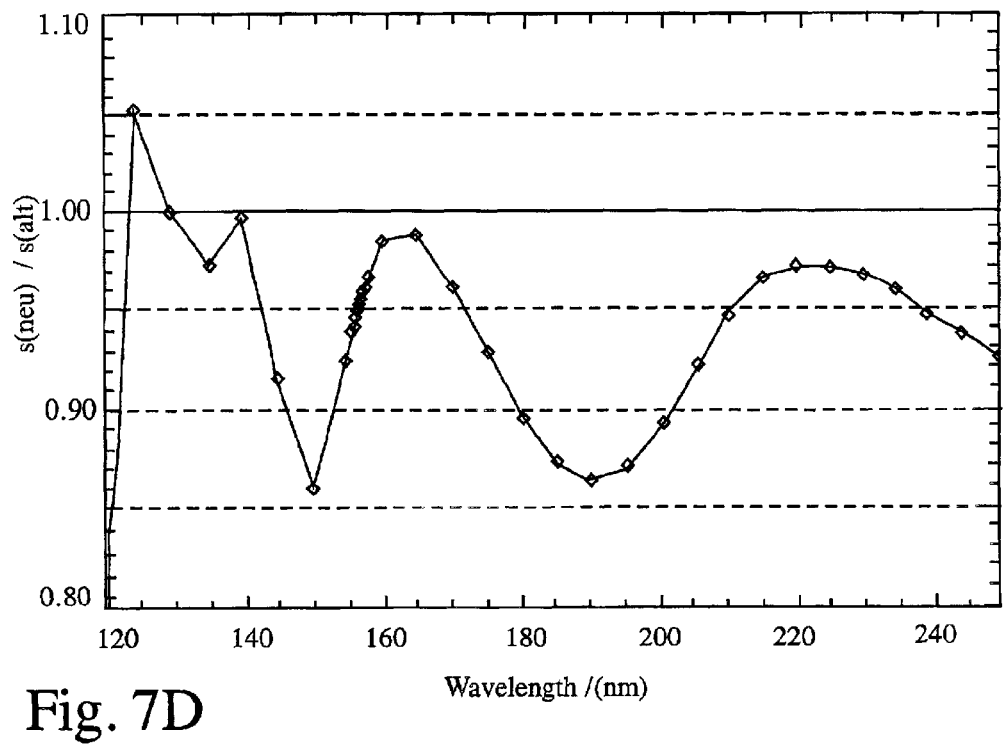

FIG. 7c shows plot a and plot b of spectral response of a UVG 004 detector versus wavelength respectively after and before exposure by more than one billion 157 nm laser shots. FIG. 7d shows a calibration plot again indicating an amount of degradation versus wavelength, wherein 1.0 would indicate that no degradation has occurred due to the 157 nm radiation exposure. At 157 nm, the spectral response was shown to decrease by about 5%.

As seen by observing FIGS. 7a–7b and FIGS. 7c–7d, the individual UVG detectors, i.e., UVG 005 and UVG 004, show remarkable differences in both their individual spectral response curves and in the amount of degradation due to long term 157 nm exposure. Though these UV-photodiodes have been successfully used for 193 nm and 248 nm detection in adequate DUV energy monitors for those excimer lasers, FIGS. 7a–7d indicate that they may not be reliable enough for usage as VUV energy monitor detectors for the 157 nm radiation of the F2-laser.

Figure 8A:
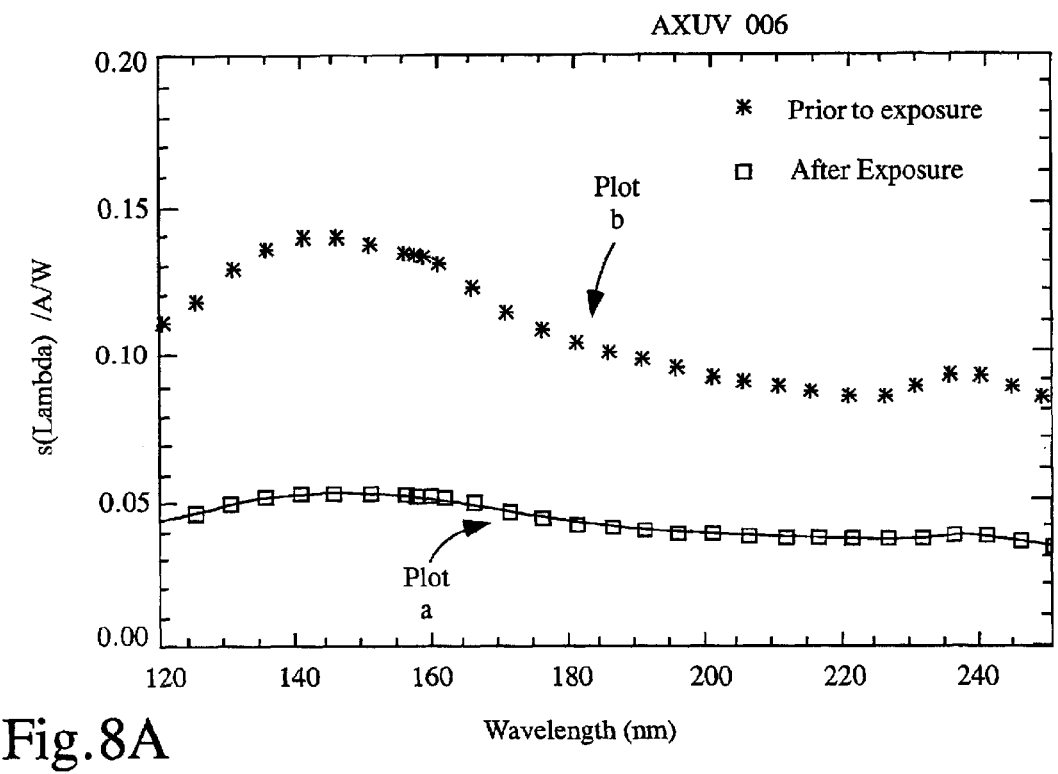
FIGS. 8a–8b show plots illustrating that a strong degradation of spectral sensitivity of a AXUV 100 VUV-detector is observed after 157 nm exposure with more than one billion laser shots.
Figure 8B:
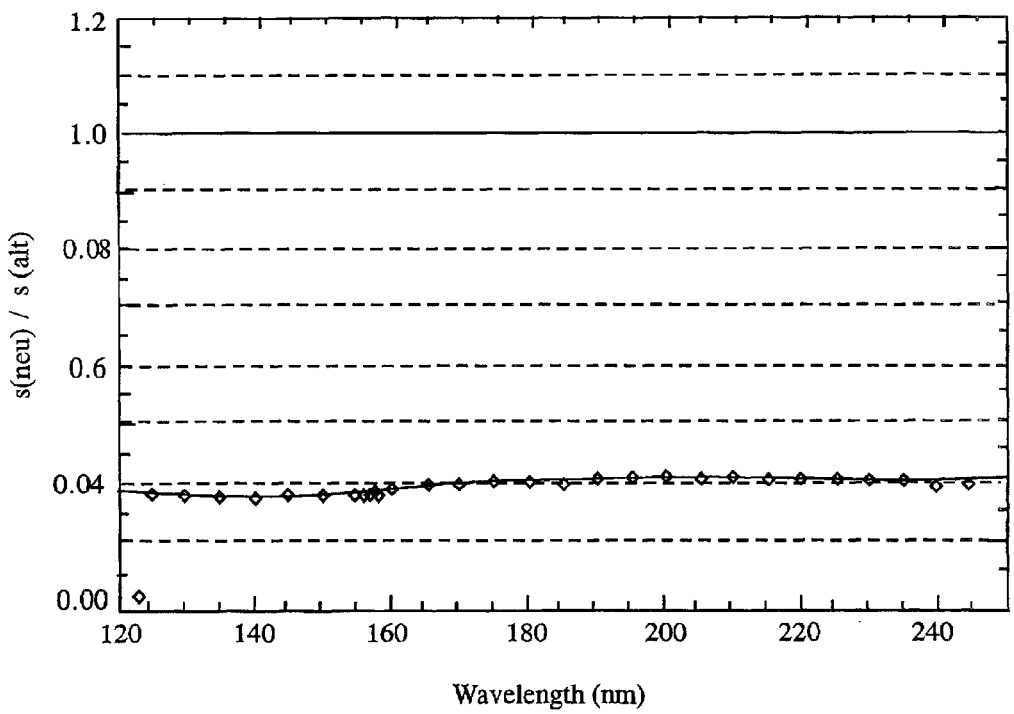

FIGS. 8a–8b show plots illustrating that a strong degradation of spectral sensitivity of an AXUV 100 VUV-detector is observed after 157 nm exposure with more than one billion laser shots. FIG. 8a shows plot a and plot b of spectral response of a AXUV 006 detector versus wavelength respectively after and before exposure by more than one billion 157 nm laser shots. FIG. 8b shows a calibration plot indicating an amount of degradation versus wavelength for the detector due to the exposure, wherein again 1.0 would indicate that no degradation has occurred due to the 157 nm radiation exposure. At 157 nm, the spectral response was shown to decrease by more than 60%.

Figure 9A:
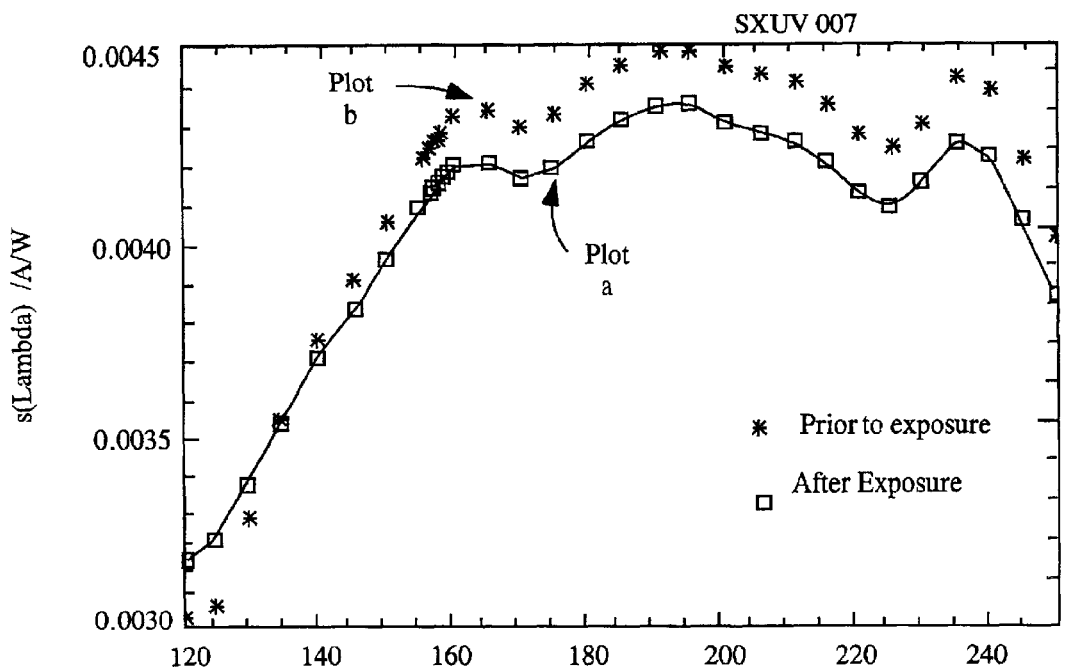
FIGS. 9a–9b show plots illustrating that a negligible degradation of spectral sensitivity of a SXUV 100 VUV-detector is observed after 157 nm exposure with more than one billion laser shots.
Figure 9B:
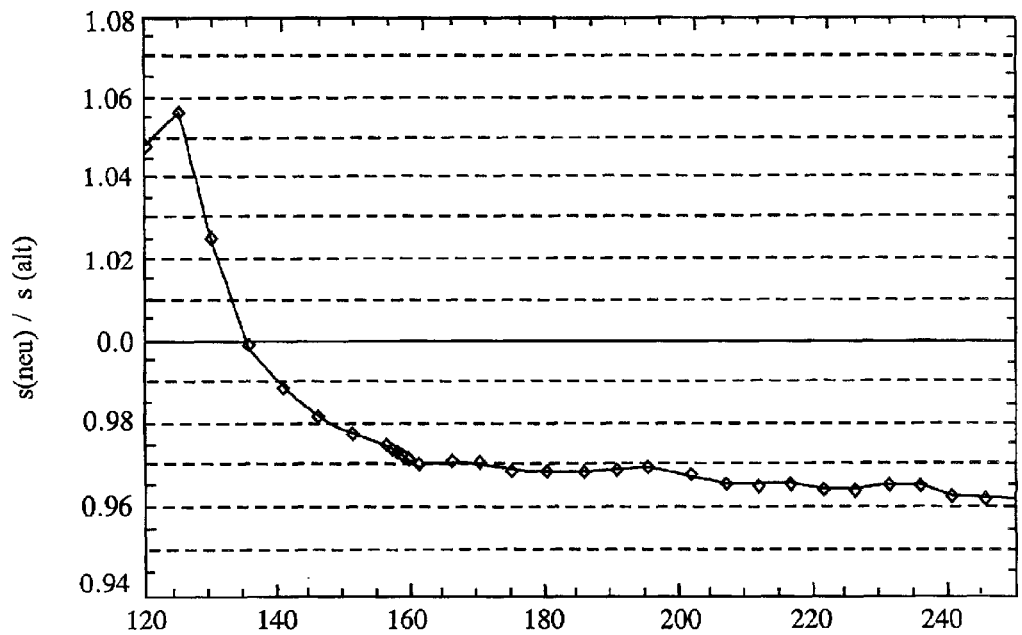

FIGS. 9a–9b show plots a and b of spectral response after and before exposure, respectively, illustrating that a negligible degradation of spectral sensitivity of a SXUV 100 VUV-detector is observed after 157 nm exposure with more than one billion laser shots. FIG. 9b shows that at 157 nm, the spectral response was shown to decrease by less than 3%.

Figure 10A:
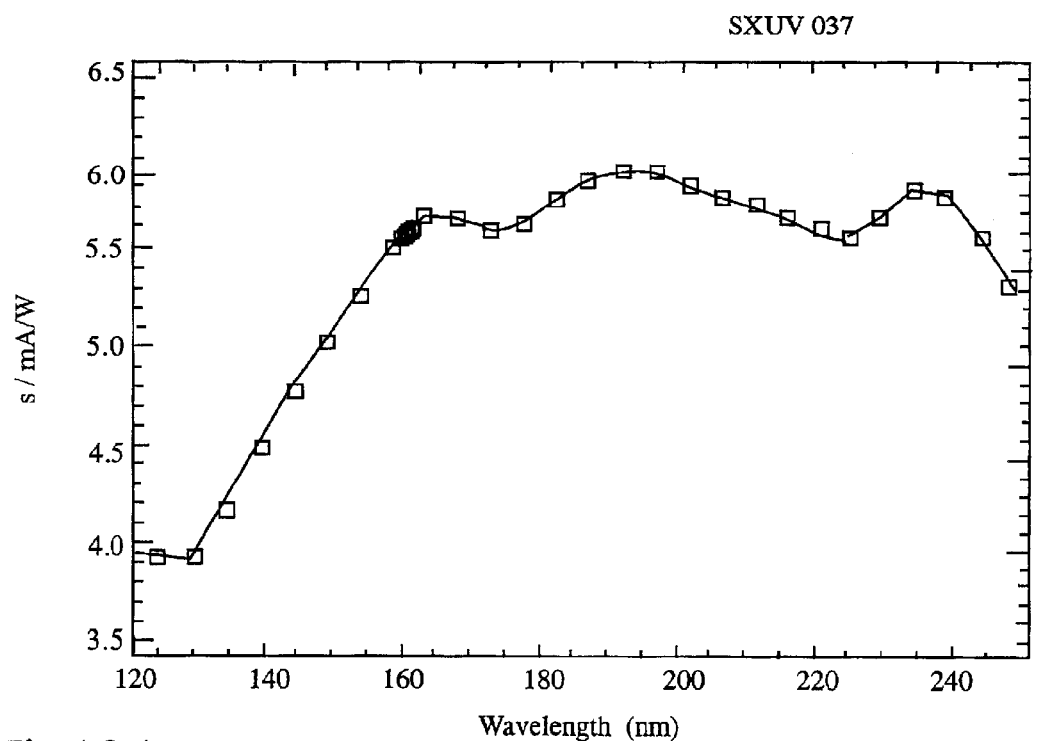
Figure 10B:
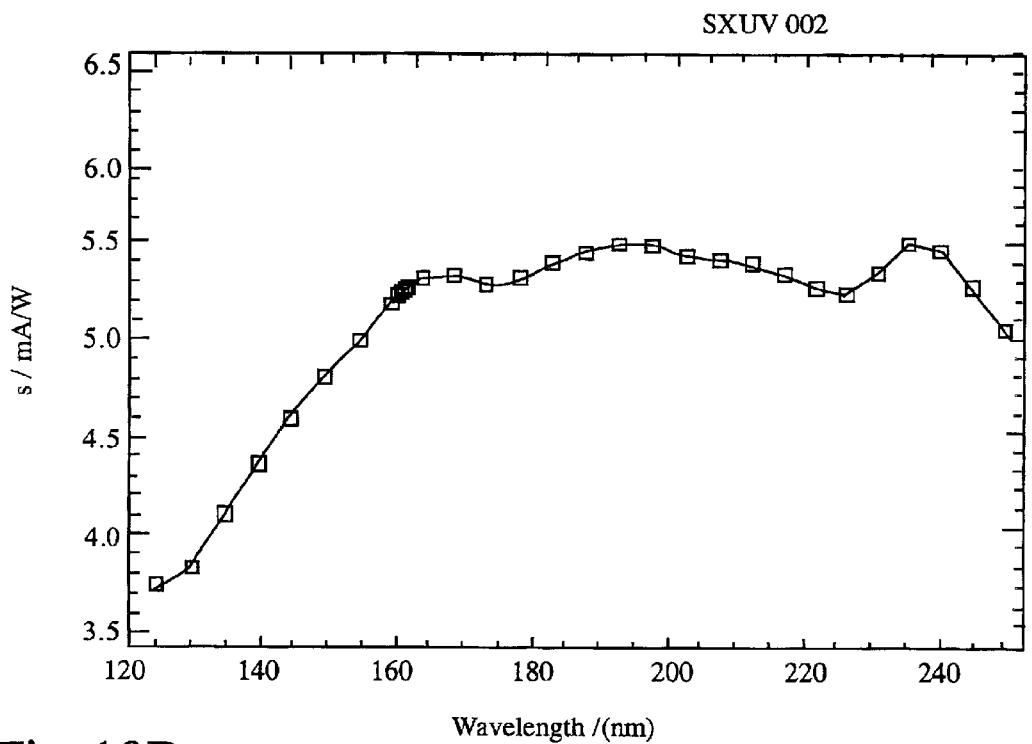

FIGS. 10a–10b show spectral responses of two respective SXUV-VUV-detectors, i.e., SXUV 037 and SXUV 002, after 157 nm exposure with more than one billion laser shots. FIG. 10a is a plot for a SXUV 037 detector and FIG. 10b is a plot for a SXUV 002 detector. Only small individual deviations are observed between the two plots which are each advantageously smooth.

Figure 11A:
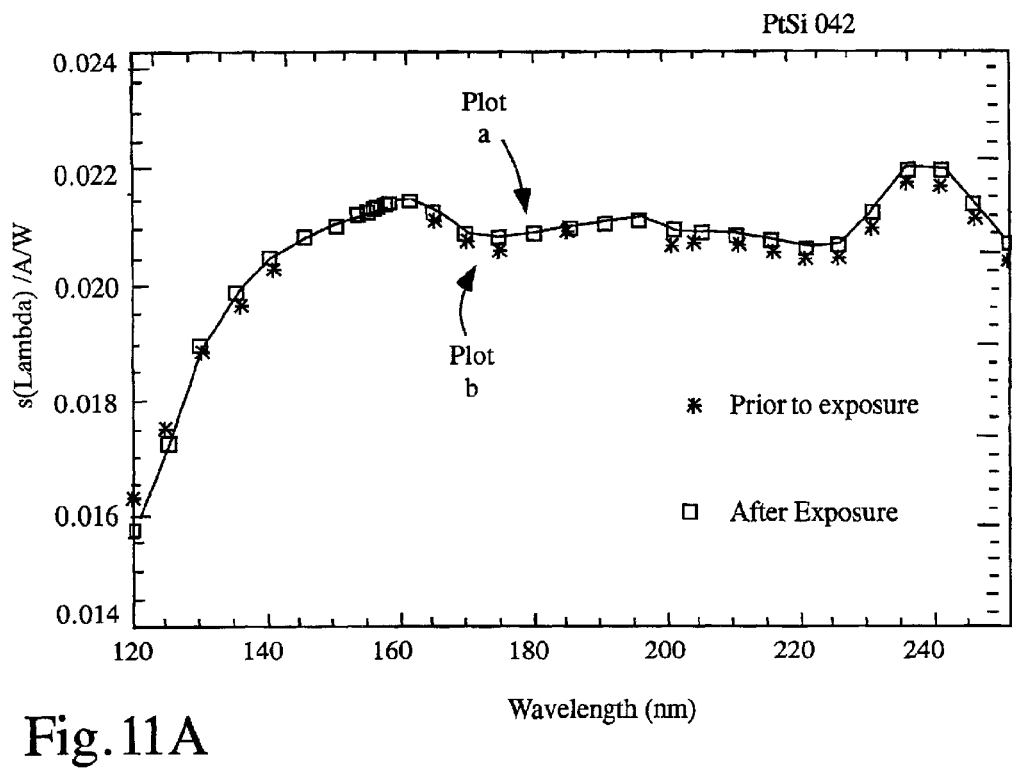
FIGS. 11a–11b illustrate that a nearly zero degradation of spectral sensitivity of a PtSi VUV detector is observed after 157 nm exposure with more than one billion laser shots.
Figure 11B:
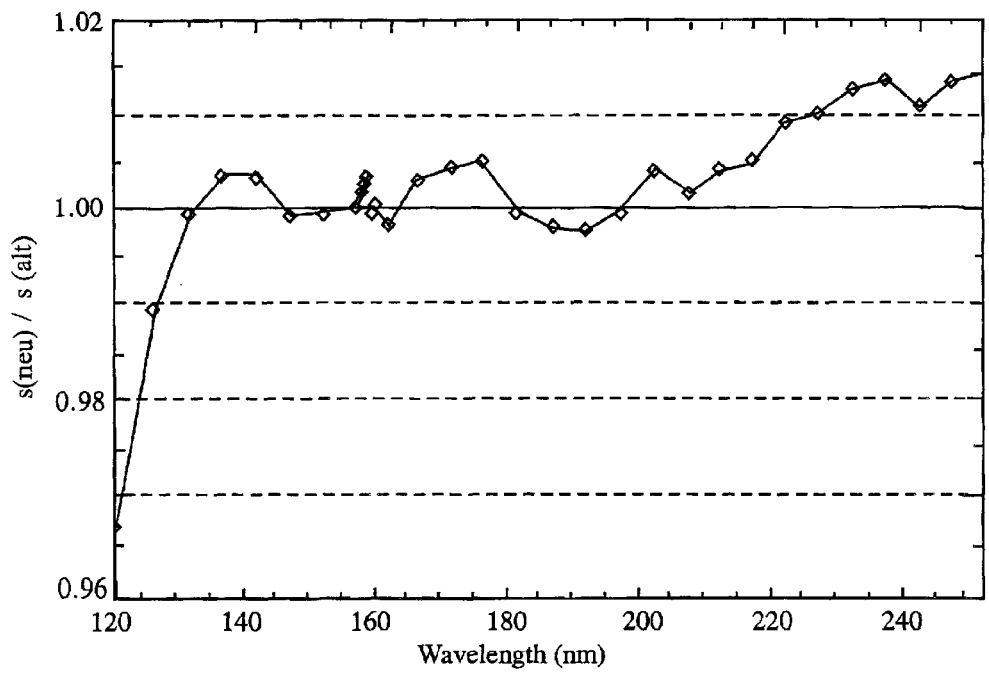

FIGS. 11a–11b shows plots a and b of a PtSi 042 detector respectively after and before exposure to more than one billion 157 nm laser shots, illustrating that a nearly zero degradation of spectral sensitivity is incurred. That is, as shown in FIG. 11b, the spectral sensitivity of the PtSi 042 detector after exposure to more than one billion 157 nm laser shots was about 100% of its sensitivity before the exposure. Thus, the PtSi 042 detector showed no observable degradation in sensitivity at 157 nm. For this reason, and by also observing the plots of FIGS. 9a–10b, a detector including a PtSi window is advantageously included in a detector for 157 nm radiation of a molecular fluorine laser.

Figure 11C:
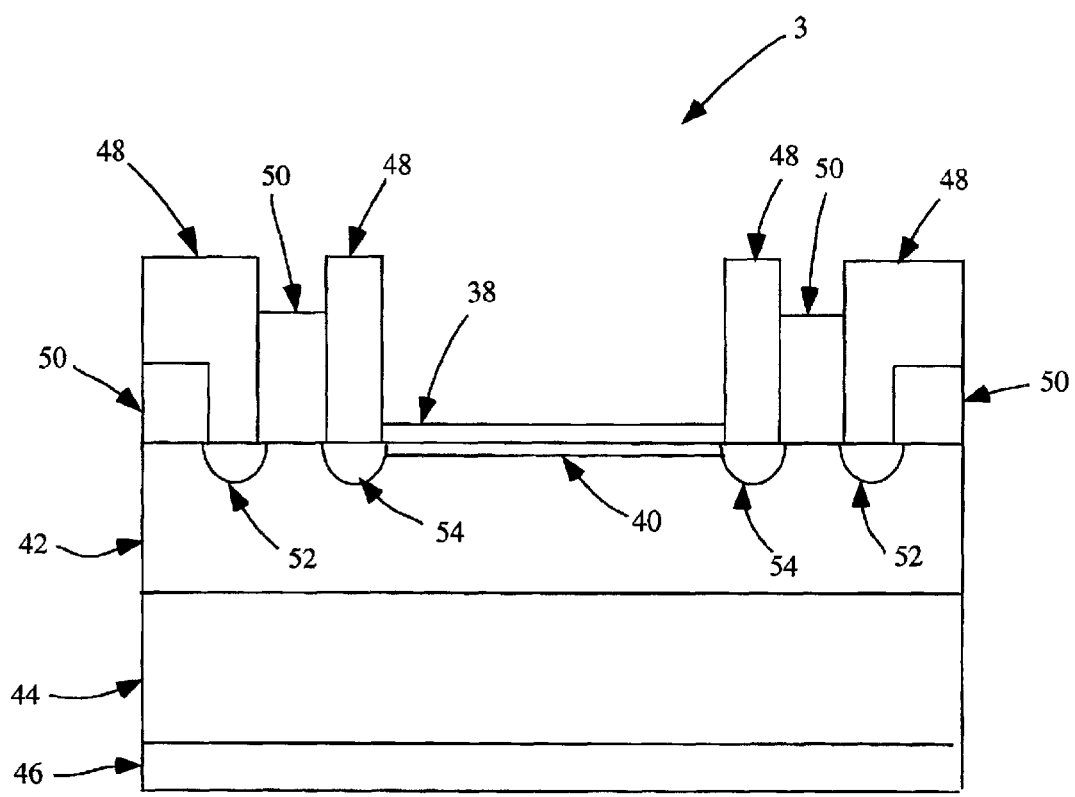
FIG. 11c shows an embodiment of a preferred detector 3 for use in a preferred embodiment.

FIG. 11c shows an embodiment of a preferred detector 3 for use in a detector housing 2 coupled with a beam path enclosure 1 as described above with respect to FIGS. 1–3. The detector 3 is manufactured by International Radiation Detectors, Inc. and further information may be found at www.ird-inc.com, which information contained at that web site is hereby incorporated by reference.

The detector 3 shown includes a platinum silicide (PtSi) window 38 for reducing VUV radiation exposure induced instability of the detector 3. More than one PtSi layer may be included in the detector design. The platinum silicide layer may be located in another location, such as beneath one or more other material layers of the device. The detector 3 also preferably includes a defect free n-type region 40 beneath the PtSi window 38 and above an epitaxial p-type region of between 6–100 microns in thickness which itself lies above a $p^+$ substrate 44 over a chromium gold base layer 46. The detector 3 also preferably has four aluminum contacts 48 and four insulating field oxide regions 50. A pair of $p^+$ regions and a pair of $n^+$ regions are also shown implanted into the epitaxial layer 42.

It is recognized herein that the presence of the PtSi reduces VUV radiation exposure induced instability of the detector 3. The PtSi may be used in combination with other materials to form a hybrid layer. The PtSi may have substitutional or inter-dispersed species doped therein, or PtSi itself may be doped into another material-type layer. Several PtSi layers may be included, wherein the PtSi layers may have other material layers therebetween. It is recognized herein that PtSi may be used in a detector that is protected within an enclosure for delivering VUV radiation, particularly around 157 nm, as is preferably emitted by a molecular fluorine laser, and that although a preferred embodiment is shown at FIG. 11c as a detailed schematic of a detector 3 of FIGS. 1–3, the detector 3 of FIGS. 1–3 preferably includes PtSi in any of a variety of forms and locations within the detector 3 as may be understood by those skilled in the art.

Figure 12A:
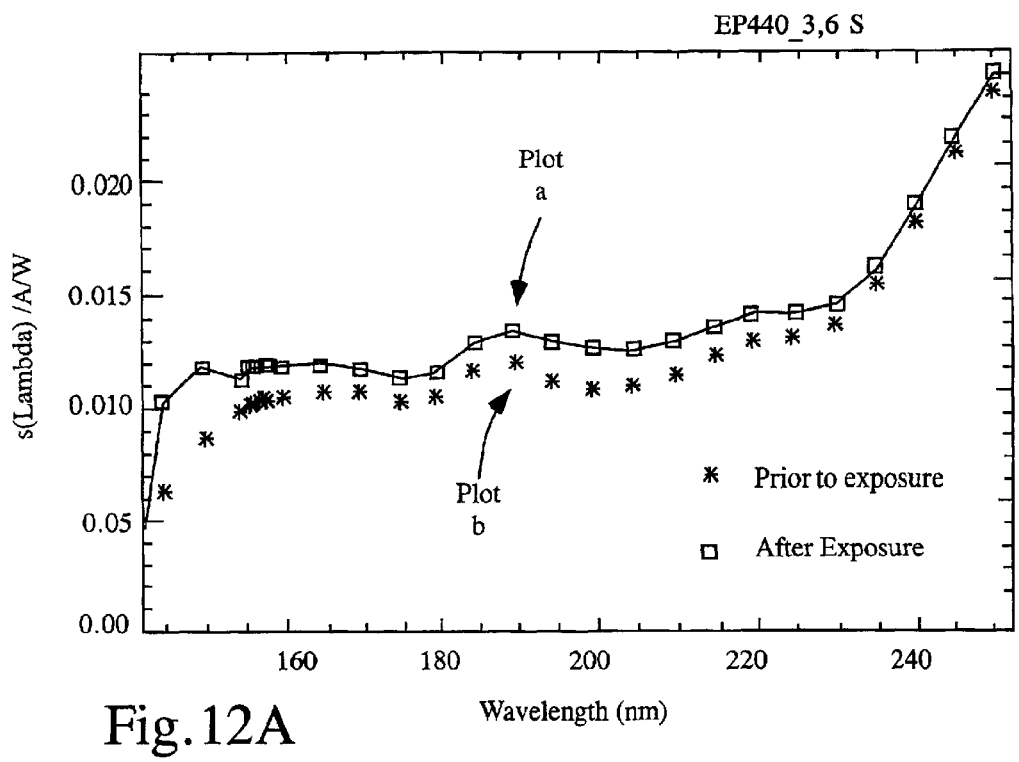
FIGS. 12a–12b illustrate that a small degradation of spectral sensitivity of a GaP VUV detector is observed after 157 nm exposure with more than one billion laser shots.
Figure 12B:
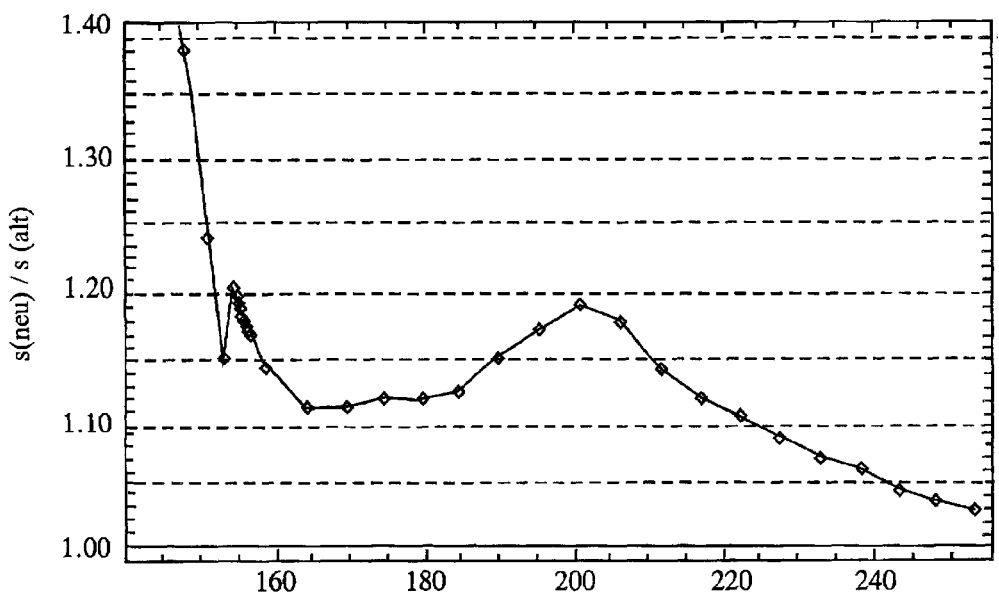

FIGS. 12a–12b illustrate a high stability in spectral sensitivity of a GaP VUV detector EP440_3,6 S is observed in plots b and a respectively before and after 157 nm exposure with more than one billion laser shots. An increase in spectral sensitivity is actual shown of about 15–20% after the exposure with very good stability. Therefore, the GaP detector is alternatively preferred for use with a detector 3 with the housings 1 and 2 of the preferred embodiment (see FIGS. 1–3).

As seen from the graphs shown in FIGS. 4a–4b, 6–11b and 12a–12b, the SXUV (IRD) detector (see FIGS. 9a–9b), the PtSi (ETH) detector (see FIGS. 11a–11c) and the GaP detector (EP440_3,6 S) (see FIGS. 12a–12b) each show small or negligible degradation, and any of these detectors are used as an VUV 157 nm energy detector 3 in the preferred embodiment.

The PtSi detector of FIGS. 11a–11c and the SXUV detector of FIGS. 9a–9b are particularly preferred based on their smooth sensitivity curves. That is, besides the very small degradation in sensitivity <5% and <2%, respectively, these detectors possess a smooth sensitivity curve and the very small fluctuations between individual pieces of the detector (see FIGS. 10a–10b). These detectors are advantageous for series production because the energy monitors can be easily pre-adjusted using the same components (e.g., using the same number of attenuators 18, see FIG. 2), reducing time consumption for individual adjustment and calibration.

The VUV-detectors SXUV (IRD) and PtSi (ETH) are thus suitable for VUV detection of the 157 nm emission of the $F_2$-molecular fluorine laser as providing a sufficiently high signal without degradation over a long period of laser exposure and as being capable of resolving individual laser pulses with repetition rates higher than 500 Hz for individual pulse regulation. The individual deviation of the sensitivity of these kinds of photodetectors is small and therefore they can be easily used in routine production.

It is also noted that the responsivity of SXUV-100 diodes is typically about eight times lower than the UVG-100 diodes. However, this may be an advantage as then less attenuation will be used for the SXUV diodes than for the UVG-100 diodes. Specifications for the UVG-100 diodes may also be found at www.ird-inc.com, mentioned above with respect to specifications for the SXUV diodes including the advantageous PtSi window. It is also noted here that the preferred detectors may be used after some in modification of the energy monitor housing 2 also as an energy monitor for the 122 nm emission of the $Ar_2$-laser. In addition, diamond detectors and quantum converter detectors may alternatively be used for the detector 3 of the preferred embodiment.

The object of the invention is thus met. The preferred embodiments described above for the energy monitor is preferably vacuum tight and/or inert gas purge system mounted on a beam delivery block which contains beam splitting optics, apertures and means to block and remarkable attenuate the visible red light emission which may be produced by the F2-laser radiation. This preferred energy monitor design, including the usage of some surprisingly stable UV-photodetectors for VUV-157 nm detection permits stable long-term energy regulation and stabilization of the F2-molecular laser for the first time. Several UV-photodetectors have been tested for usability in the VUV range. Only a small number of them are observed as being useful under certain illumination conditions, as realized by the preferred monitor shown at FIGS. 1–3, and show a stable and reliable performance in energy monitor design as given in these preferred embodiments.

Figure 13:
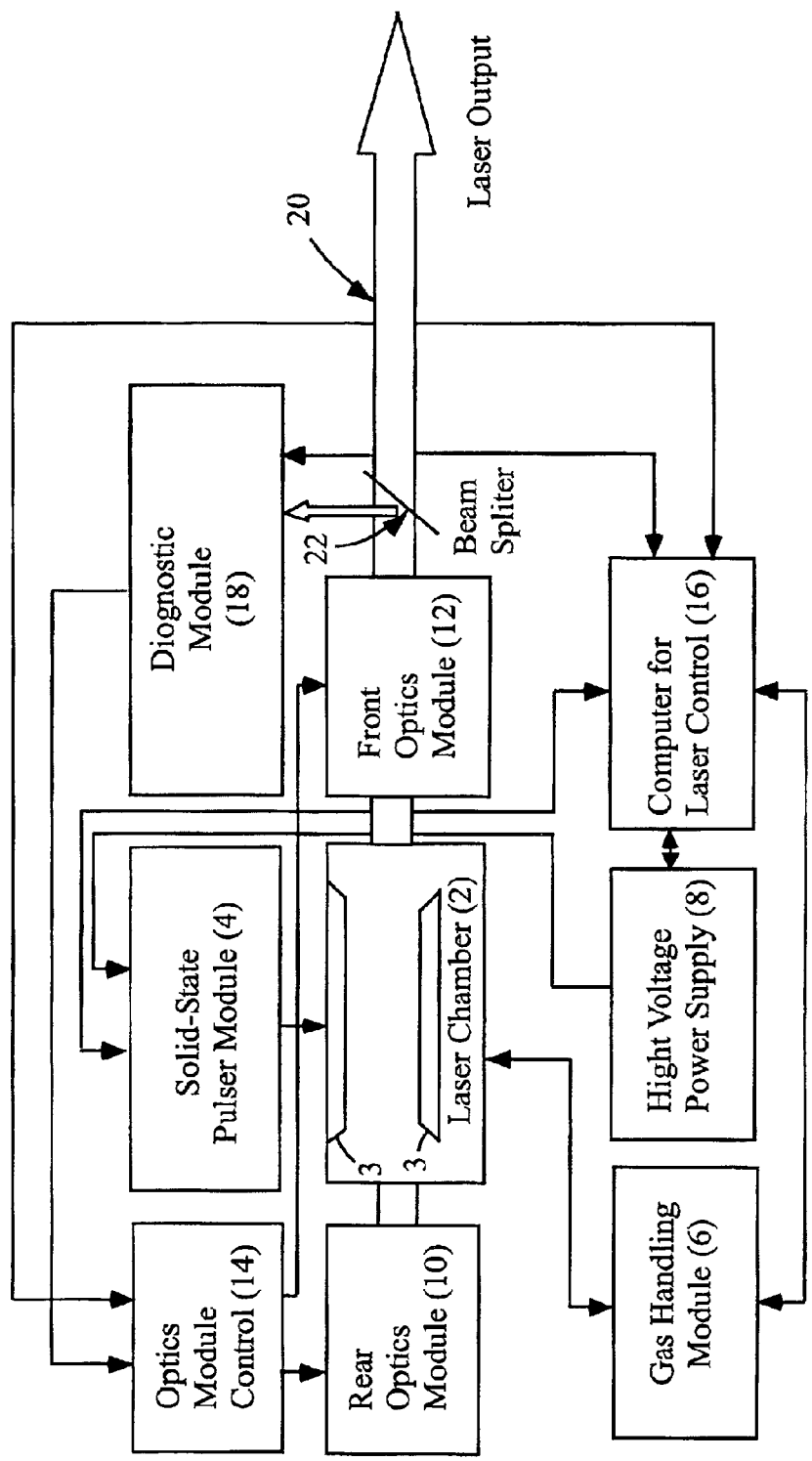
FIG. 13 shows a molecular fluorine (or ArF) laser system in accord with a preferred embodiment.

FIG. 13 shows a molecular fluorine laser system in accord with a preferred embodiment. FIG. 13 and the description that follows is also applicable to the preferred ArF laser system except for discussion of the separating of 157 nm and visible radiation, and so a separate ArF laser description is not included hereunder. The system includes a laser chamber 2 filled with a gas mixture and having a pair of main electrodes 3 and one or more preionization electrodes (not shown). The electrodes 3 are connected to a solid-state pulser module 4. A gas handling module 6 is connected to the laser chamber 2. A high voltage power supply 8 is connected to the pulser module 4. A laser resonator is shown surrounding the laser chamber and including a rear optics module 10 and a front optics module 12. An optics control module 14 communicates with the rear and front optics modules 10, 12. A computer or processor 16 control various aspects of the laser system. A diagnostic module 18 receives a portion of the output beam 20 from a beam splitter 22.

The gas mixture in the laser chamber 2 typically includes about 0.1% F2 and 99.9% buffer gas. For the ArF laser, about 1% argon is include with 0.1% fluorine and 98.9% buffer gas. The buffer gas preferably comprises neon and may be a mixture of neon and helium (see U.S. Pat. No. 6,157,162, which is hereby incorporated by reference. A trace amount of a gas additive such as xenon, argon or krypton may be included (see U.S. patent application Ser. Nos. 09/513,025 and 60/160,126, which are each assigned to the same assignee as the present application and are hereby incorporated by reference).

The gas mixture is preferably monitored and controlled using an expert system (see U.S. patent application Ser. No. 09/379,034, which is assigned to the same assignee, and U.S. Pat. No. 5,440,578, each of which is hereby incorporated by reference). One or more beam parameters indicative of the fluorine concentration in the gas mixture, which is subject to depletion, may be monitored, and the gas supply replenished accordingly (see U.S. patent application Ser. Nos. 09/447,882, 09/418,052, 09/379,034, 60/171,717 and 09/484,818 applications, which are assigned to the same assignee and are hereby incorporated by reference). The diagnostic module 18 preferably includes monitoring equipment or a detector as set forth above, and which may also be positioned to receive a beam portion split off from within the laser resonator, as mentioned above (see also U.S. patent application No. 60/166,967, which is assigned to the same assignee as the present application and is hereby incorporated by reference). The processor 16 preferably receives information from the diagnostic module 18 concerning the halogen concentration in the gas mixture and initiates gas replenishment actions such as micro-halogen injections, mini and partial gas replacements, and pressure adjustments by communicating with the gas handling module 6.

Although not shown, the gas handling module 6 has a series of valves connected to gas containers external to the laser system. The gas handling module 6 may also include an internal gas supply such as a halogen and/or xenon supply or generator (see the '025 application). A gas compartment or (not shown) may be included in the gas handling module 6 for precise control of the micro halogen injections (see the '882 and '717 applications, mentioned above, and U.S. Pat. No. 5,396,514, which is assigned to the same assignee as the present application and is hereby incorporated by reference).

The wavelength and bandwidth of the output beam 20 are also preferably monitored and controlled. A preferred wavelength calibration apparatus and procedure are described at the '344 application, mentioned above, and at U.S. Pat. Nos. 6,160,832 and 4,905,243, which are hereby incorporated by reference. The monitoring equipment may be included in the diagnostic module 18 or the system may be configured to outcouple a beam portion elsewhere such as from the rear optics module, since only a small intensity beam portion is typically used for wavelength calibration (see the '832 patent). The diagnostic module 18 may be integrated with the front optics module 12, and the line-narrowing components of the resonator may be integrated in the front optics module 12, as well, such that only a HR mirror and an optional aperture are included in the rear optics module 10 (see U.S. patent application No. 60/166,967, which is assigned to the same assignee as the present application and is hereby incorporated by reference).

Preferred main electrodes 3 are described at U.S. patent application Ser. Nos. 60/128,227, 09/453,670 and 60/184,705, which are each assigned to the same assignee as the present application and are hereby incorporated by reference. Other electrode configurations are set forth at U.S. Pat. Nos. 5,729,565 and 4,860,300, each of which is assigned to the same assignee and is hereby incorporated by reference. Preferred preionization units are set forth at U.S. patent application Ser. Nos. 09/692,265 and 09/247,887, each of which is assigned to the same assignee as the present application and is hereby incorporated by reference. The preferred solid state pulser module 4 and the high voltage power supply 8 are set forth at U.S. Pat. Nos. 6,020,723 and 6,005,880 and U.S. patent application Ser. Nos. 09/432,348, 60/149,392, 60/204,905 and 09/390,146, each of which is assigned to the same assignee as the present application and is hereby incorporated by reference into the present application.

The resonator includes optics for line-selection and also preferably for narrowing the selected line (see U.S. patent application Ser. Nos. 09/317,695, 09/317,527, 09/657,396, 60/212,183, 09/599,130, 60/170,342, 60/166,967, 60/170,919, 09/584,420, 60/212,257, 60/212,301, 60/215,933, 09/130,277, 09/244,554, 60/124,241, 09/599,130, 09/598,552, 60/147,219, and 09/073,070, 60/212,183 and U.S. Pat. Nos. 5,761,236 and 5,946,337, each of which is assigned to the same assignee as the present application, and U.S. Pat. Nos. 5,095,492, 5,684,822, 5,835,520, 5,852,627, 5,856,991, 5,898,725, 5,901,163, 5,917,849, 5,970,082, 5,404,366, 4,975,919, 5,142,543, 5,596,596, 5,802,094, 4,856,018, and 4,829,536, all of which are hereby incorporated by reference). Some of the line selection and/or line narrowing techniques set forth in these patents and patent applications may be used in combination with or alternative to any of the aspects of the invention set forth below.

Also particularly for the molecular fluorine laser system, an enclosure (not shown) seals the beam path of the beam 20 such as to keep the beam path free of VUV photoabsorbing species and/or sub-200 nm photoabsorbing species, as described above. Smaller enclosures preferably seal the beam path between the chamber 2 and the optics modules 10 and 12.

Advantageously, the diagnostic components may be integrated into the front optics module 12, separate enclosure components that would otherwise be used between, e.g., a separate diagnostic module 18 and beam splitter module 22, or between the front optics module 12 and beam splitter module 22, would not be used. The preferred enclosure is described above in detail, and variations may be derived from U.S. patent application Ser. Nos. 09/343,333, 09/598,552, 09/594,892, 09/131,580 and 60/140,530, each of which is assigned to the same assignee and is hereby incorporated by reference, and alternative configurations are set forth at U.S. Pat. Nos. 5,559,584, 5,221,823, 5,763,855, 5,811,753 and 4,616,908, all of which are hereby incorporated by reference.

Those skilled in the art will appreciate that the just-disclosed preferred embodiments are subject to numerous adaptations and modifications without departing from the scope and spirit of the invention. Therefore, it is to be understood that, within the scope and spirit of the invention, the invention may be practiced other than as specifically described above. In particular, the invention is to be interpreted in accordance with the appended claims, and equivalents thereof, without limitations being read from the specification above.

What is claimed is:

1. A beam parameter monitoring unit for coupling with a molecular fluorine ($F_2$) or ArF laser resonator that produces an output beam having a wavelength below 200 nm, comprising:

an uncoated beam splitter formed of substantially material transparent to radiation having said wavelength below 200 nm disposed to reflect a portion of the radiation in the output beam;

a detector for measuring at least one optical parameter of the output beam portion reflected by the uncoated beam splitter; and a beam path enclosure containing said uncoated beam splitter and having an interior prepared such that an optical path of said beam portion through said enclosure from said laser resonator to said detector via said reflection by said beam splitter is substantially free of photoabsorbing species that substantially photoabsorb radiation of said wavelength below 200 nm so that the beam portion reflected by said beam splitter reaches said detector without substantial attenuation from said photoabsorbing species.

2. The beam parameter monitoring unit of claim 1, wherein said substantially transparent material of said uncoated beam splitter includes Ca $F_2$.

3. The beam parameter monitoring unit of claim 1, wherein said substantially transparent material of said uncoated beam splitter includes Mg $F_2$.

4. The beam parameter monitoring unit of claim 1, wherein said detector is disposed within a detector enclosure that is sealably coupled with said beam path enclosure for maintaining an interior of said detector enclosure substantially free of said photoabsorbing species.

5. The beam parameter monitoring unit of claim 4, wherein said detector enclosure comprises one or more ports for purging said detector enclosure with an inert gas to maintain said enclosure substantially free of said photoabsorbing species.

6. The beam parameter monitoring unit of claim 1, wherein said uncoated beam splitter is disposed along an optical path of said output beam from said laser resonator and transmits a substantial portion of light incident thereon for permitting said transmitted substantial portion to propagate toward an application process while said detector monitors said at least one parameter of said output beam by detecting said beam portion reflected by said uncoated beam splitter.

7. The beam parameter monitoring unit of claim 1, wherein said detector is a photodiode detector including platinum silicide for reducing radiation exposure induced instability of said detector.

8. The beam parameter monitoring unit of claim 1, wherein said laser is a molecular fluorine laser that further produces visible radiation, said unit further comprising means optically disposed between said resonator and said detector for separating said visible radiation from 157 nm radiation emitted from the molecular fluorine laser.

9. The beam parameter monitoring unit of claim 8, wherein said separating means includes a dispersion prism.

10. The beam parameter monitoring unit of claim 8, wherein said separating means includes an optical element selected from the group of optical elements consisting of a dispersion prism, a dichroic mirror, a holographic beam sampler and a diffraction grating.

11. The beam parameter monitoring unit of claim 1, wherein said beam path enclosure comprises one or more ports for purging said beam path enclosure with an inert gas to maintain said enclosure substantially free of said photoabsorbing species.

12. A beam parameter monitoring unit for coupling with a molecular fluorine ($F_2$) or ArF laser resonator that produces an output beam having a wavelength below 200 nm, comprising:
 a beam splitter disposed to separate said output beam into a first component and a second component, said first component being used for processing a workpiece;
 a detector including a platinum silicide window for measuring at least one optical parameter of the second component of said output beam after said beam splitter, said platinum silicide window for reducing sub-200 nm radiation exposure induced instability of said detector; and
 a beam path enclosure containing said beam splitter and having an interior prepared such that an optical path of said second component of said output beam through said enclosure from said laser resonator to said detector via said beam splitter is substantially free of sub-200 nm photoabsorbing species so that said second component reaches said detector without substantial attenuation from said photoabsorbing species.

13. The beam parameter monitoring unit of claim 12, wherein said detector is disposed within a detector enclosure that is sealably coupled with said beam path enclosure for maintaining an interior of said detector enclosure substantially free of said photoabsorbing species.

14. The beam parameter monitoring unit of claim 13, wherein said detector enclosure comprises one or more ports for purging said detector enclosure with an inert gas to maintain said enclosure substantially free of said photoabsorbing species.

15. The beam parameter monitoring unit of claim 12, wherein said laser is a molecular fluorine laser that further produces visible radiation, said unit further comprising means disposed between said resonator and said detector for separating said visible radiation from said 157 nm radiation.

16. The beam parameter monitoring unit of claim 15, wherein said separating means includes a dispersion prism.

17. The beam parameter monitoring unit of claim 15, wherein said separating means includes an optical element selected from the group of optical elements consisting of a dispersion prism, a dichroic mirror, a holographic beam sampler and a diffraction grating.

18. The beam parameter monitoring unit of claim 12, wherein said beam path enclosure comprises one or more ports for purging said beam path enclosure with an inert gas to maintain said enclosure substantially free of said sub-200 nm photoabsorbing species.

19. A beam parameter monitoring unit for coupling with a molecular fluorine ($F_2$) laser resonator that produces an output beam having a wavelength around 157 nm, comprising:
 a beam splitter disposed to separate said output beam into a first component and a second component, said first component being used for processing a workpiece;
 a detector including platinum silicide for measuring at least one optical parameter of the second component of said output beam after said beam splitter, said platinum silicide being used for reducing VUV radiation exposure induced instability of said detector; and
 a beam path enclosure containing said beam splitter and having an interior prepared such that an optical path of said second component of said output beam through said enclosure from said laser resonator to said detector via said beam splitter is substantially free of VUV photoabsorbing species so that said second component reaches said detector without substantial attenuation from said photoabsorbing species.

20. The beam parameter monitoring unit of claim 19, wherein said detector is disposed within a detector enclosure that is sealably coupled with said beam path enclosure for maintaining an interior of said detector enclosure substantially free of said photoabsorbing species.

21. The beam parameter monitoring unit of claim 20, wherein said detector enclosure comprises one or more ports for purging said detector enclosure with an inert gas to maintain said enclosure substantially free of said VUV photoabsorbing species.

22. The beam parameter monitoring unit of claim 19, wherein said molecular fluorine laser further produces visible radiation, said unit further comprising means disposed between said resonator and said detector for separating said visible radiation from said 157 nm radiation.

23. The beam parameter monitoring unit of claim 22, wherein said separating means includes a dispersion prism.

24. The beam parameter monitoring unit of claim 22, wherein said separating means includes an optical element selected from the group of optical elements consisting of a dispersion prism, a dichroic mirror, a holographic beam sampler and a diffraction grating.

25. The beam parameter monitoring unit of claim 19, wherein said beam path enclosure comprises one or more ports for purging said beam path enclosure with an inert gas to maintain said enclosure substantially free of said VUV photo absorbing species.

26. A beam parameter monitoring unit for coupling with an argon fluoride (ArF) excimer laser resonator that produces an output beam having a wavelength around 193 nm, comprising:
 a beam splitter disposed to separate said output beam into a first component and a second component, said first component being used for processing a workpiece;
 a detector including platinum silicide for measuring at least one optical parameter of the second component of said output beam after said beam splitter, said platinum silicide being used for reducing 193 nm radiation exposure induced instability of said detector; and
 a beam path enclosure containing said beam splitter and having an interior prepared such that an optical path of said second component of said output beam through said enclosure from said laser resonator to said detector via said beam splitter is substantially free of 193 nm photoabsorbing species so that said second component reaches said detector without substantial attenuation from said photoabsorbing species.

27. The beam parameter monitoring unit of claim 26, wherein said detector is disposed within a detector enclosure that is sealably coupled with said beam path enclosure for maintaining an interior of said detector enclosure substantially free of said photoabsorbing species.

28. The beam parameter monitoring unit of claim 27, wherein said detector enclosure comprises one or more ports for purging said detector enclosure with an inert gas to maintain said enclosure substantially free of said 193 nm photoabsorbing species.

29. The beam parameter monitoring unit of claim 26, wherein said beam path enclosure comprises one or more ports for purging said beam path enclosure with an inert gas to maintain said enclosure substantially free of said 193 nm photoabsorbing species.

30. A beam parameter monitoring unit for coupling with a molecular fluorine ($F_2$) laser resonator emitting around 157 nm, comprising:
 a detector including platinum silicide for measuring at least one optical parameter of a first beam of 157 nm radiation emitted from said laser resonator, said platinum silicide being used for reducing VUV radiation exposure induced instability of said detector; and
 a beam path enclosure having an interior prepared such that an optical path of said first beam through said enclosure from said laser resonator to said detector is substantially free of VUV photoabsorbing species so that said first beam reaches said detector without substantial attenuation from said photoabsorbing species, and wherein a second beam of 157 nm radiation emitted from said laser resonator is used for processing a workpiece while said detector measures said at least one optical parameter of said first beam.

31. The beam parameter monitoring unit of claim 30, wherein said detector is disposed within a detector enclosure that is sealably coupled with said beam path enclosure for maintaining an interior of said detector enclosure substantially free of said VUV photoabsorbing species.

32. The beam parameter monitoring unit of claim 31, wherein said detector enclosure comprises one or more ports for purging said detector enclosure with an inert gas to maintain said enclosure substantially free of said VUV photoabsorbing species.

33. The beam parameter monitoring unit of claim 30, wherein said molecular fluorine laser resonator further produces visible radiation, said unit further comprising means disposed between said resonator and said detector for separating said visible radiation from said 157 nm radiation.

34. The beam parameter monitoring unit of claim 33, wherein said separating means includes a dispersion prism.

35. The beam parameter monitoring unit of claim 33, wherein said separating means includes an optical element selected from the group of optical elements consisting of a dispersion prism, a dichroic mirror, a holographic beam sampler and a diffraction grating.

36. The beam parameter monitoring unit of claim 30, wherein said beam path enclosure comprises one or more ports for purging said beam path enclosure with an inert gas to maintain said enclosure substantially free of said VUV photoabsorbing species.

37. A beam parameter monitoring unit for coupling with an argon fluoride (ArF) excimer laser resonator emitting around 193 nm, comprising:
 a detector including platinum silicide for measuring at least one optical parameter of a first beam of 193 nm radiation emitted from said laser resonator, said platinum silicide being used for reducing 193 nm radiation exposure induced instability of said detector; and
 a beam path enclosure having an interior prepared such that an optical path of said first beam through said enclosure from said laser resonator to said detector is substantially free of 193 nm photoabsorbing species so that said first beam reaches said detector without substantial attenuation from said photoabsorbing species, and wherein a second beam of 193 nm radiation emitted from said laser resonator is used for processing a workpiece while said detector measures said at least one optical parameter of said first beam.

38. The beam parameter monitoring unit of claim 37, wherein said detector is disposed within a detector enclosure that is sealably coupled with said beam path enclosure for maintaining an interior of said detector enclosure substantially free of said 193 nm photoabsorbing species.

39. The beam parameter monitoring unit of claim 38, wherein said detector enclosure comprises one or more ports for purging said detector enclosure with an inert gas to maintain said enclosure substantially free of said 193 nm photoabsorbing species.

40. The beam parameter monitoring unit of claim 37, wherein said beam path enclosure comprises one or more ports for purging said beam path enclosure with an inert gas to maintain said enclosure substantially free of said 193 nm photoabsorbing species.

41. A beam parameter monitoring unit for coupling with a molecular fluorine ($F_2$) laser resonator emitting around 157 nm, comprising:
 a detector for measuring at least one optical parameter of a first beam of 157 nm radiation emitted from said laser resonator;
 a beam path enclosure having an interior prepared such that an optical path of said first beam through said enclosure from said laser resonator to said detector is substantially free of VUV photoabsorbing species so that said first beam reaches said detector without substantial attenuation from said photoabsorbing species; and
 means disposed between said resonator and said detector for separating said visible radiation from said 157 nm radiation, and wherein a second beam of 157 nm radiation emitted from said laser resonator is used for processing a workpiece while said detector measures said at least one optical parameter of said first beam.

42. The beam parameter monitoring unit of claim 41, wherein said separating means includes a dispersion prism.

43. The beam parameter monitoring unit of claim 41, wherein said separating means includes an optical element selected from the group of optical elements consisting of a dispersion prism, a dichroic mirror, a holographic beam sampler and a diffraction grating.

44. The beam parameter monitoring unit of claim 41, wherein said detector is disposed within a detector enclosure that is sealably coupled with said beam path enclosure for maintaining an interior of said detector enclosure substantially free of said VUV photoabsorbing species.

45. The beam parameter monitoring unit of claim 44, wherein said detector enclosure comprises one or more ports for purging said detector enclosure with an inert gas to maintain said enclosure substantially free of said VUV photoabsorbing species.

46. The beam parameter monitoring unit of claim 41, wherein said beam path enclosure comprises one or more ports for purging said beam path enclosure with an inert gas to maintain said enclosure substantially free of said VUV photoabsorbing species.

47. A molecular fluorine ($F_2$) or ArF laser system, comprising:
- a discharge chamber filled with a laser gas including molecular fluorine and a buffer gas;
- a plurality of electrodes in the discharge chamber connected to a discharge circuit for energizing the laser gas;
- a resonator having the discharge chamber therein for generating an output beam;
- a beam parameter monitoring unit as in any of claim 1 or 2.

48. A molecular fluorine ($F_2$) laser system, comprising:
- a discharge chamber filled with a laser gas including molecular fluorine and a buffer gas;
- a plurality of electrodes in the discharge chamber connected to a discharge circuit for energizing the laser gas;
- a resonator having the discharge chamber therein for generating an output beam;
- a beam parameter monitoring unit as in any of claim 19 or 30.

49. An ArF laser system, comprising:
- a discharge chamber filled with a laser gas including molecular fluorine, argon and a buffer gas;
- a plurality of electrodes in the discharge chamber connected to a discharge circuit for energizing the laser gas;
- a resonator having the discharge chamber therein for generating an output beam;
- a beam parameter monitoring unit as in any of claim 26 or 37.

* * * * *